Oct. 6, 1942.  A. W. MILLS ET AL  2,297,789
TRANSCRIBING APPARATUS
Filed Nov. 4, 1939    15 Sheets-Sheet 1

Oct. 6, 1942.

A. W. MILLS ET AL 2,297,789

TRANSCRIBING APPARATUS

Filed Nov. 4, 1939

INVENTORS
Albert W. Mills
Edward J. Rolenda
BY
ATTORNEY

Oct. 6, 1942.　　A. W. MILLS ET AL　　2,297,789
TRANSCRIBING APPARATUS
Filed Nov. 4, 1939　　15 Sheets-Sheet 5

FIG.6.

INVENTORS
Albert W. Mills
BY Edward J. Palinda
ATTORNEY

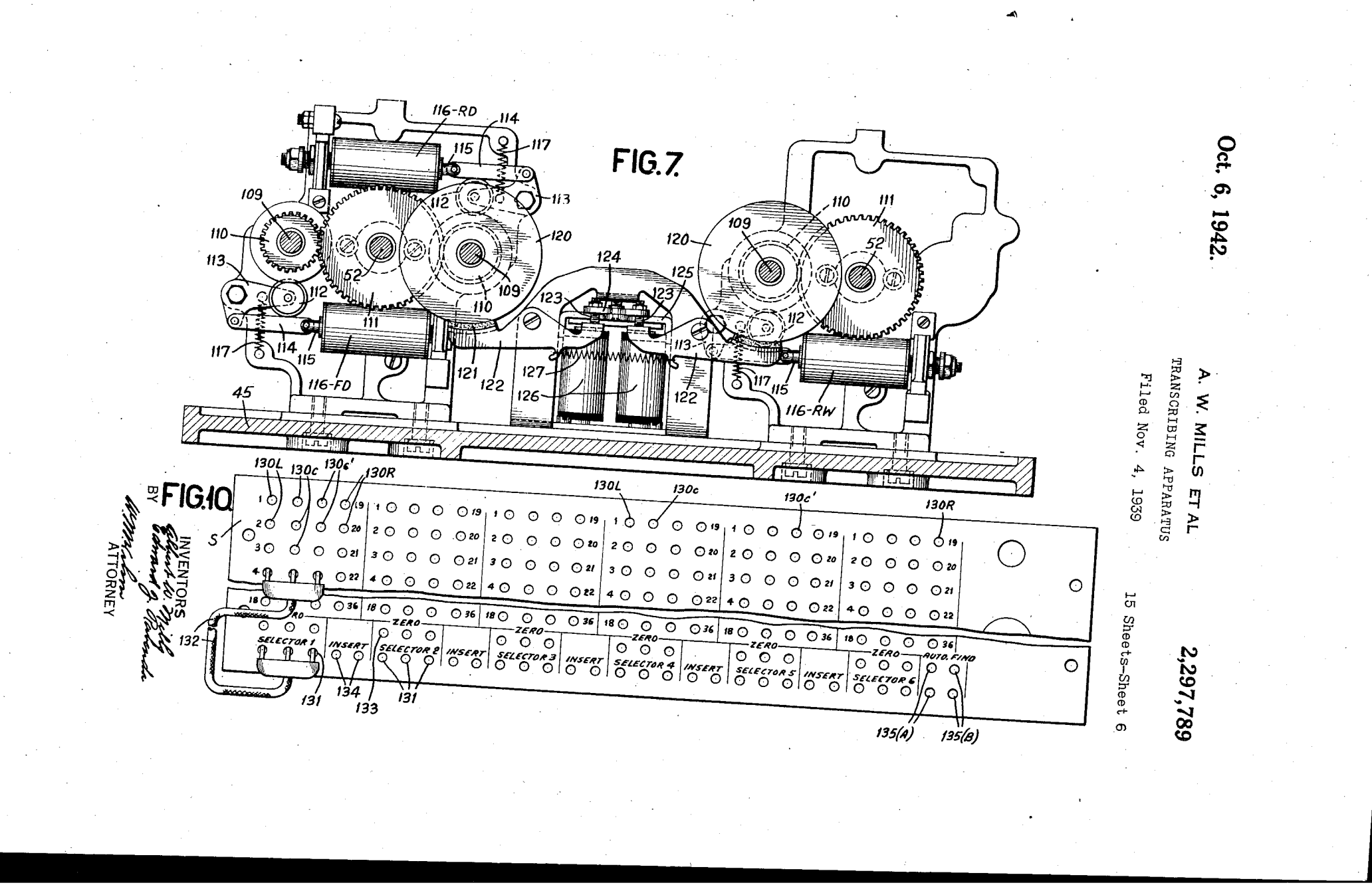

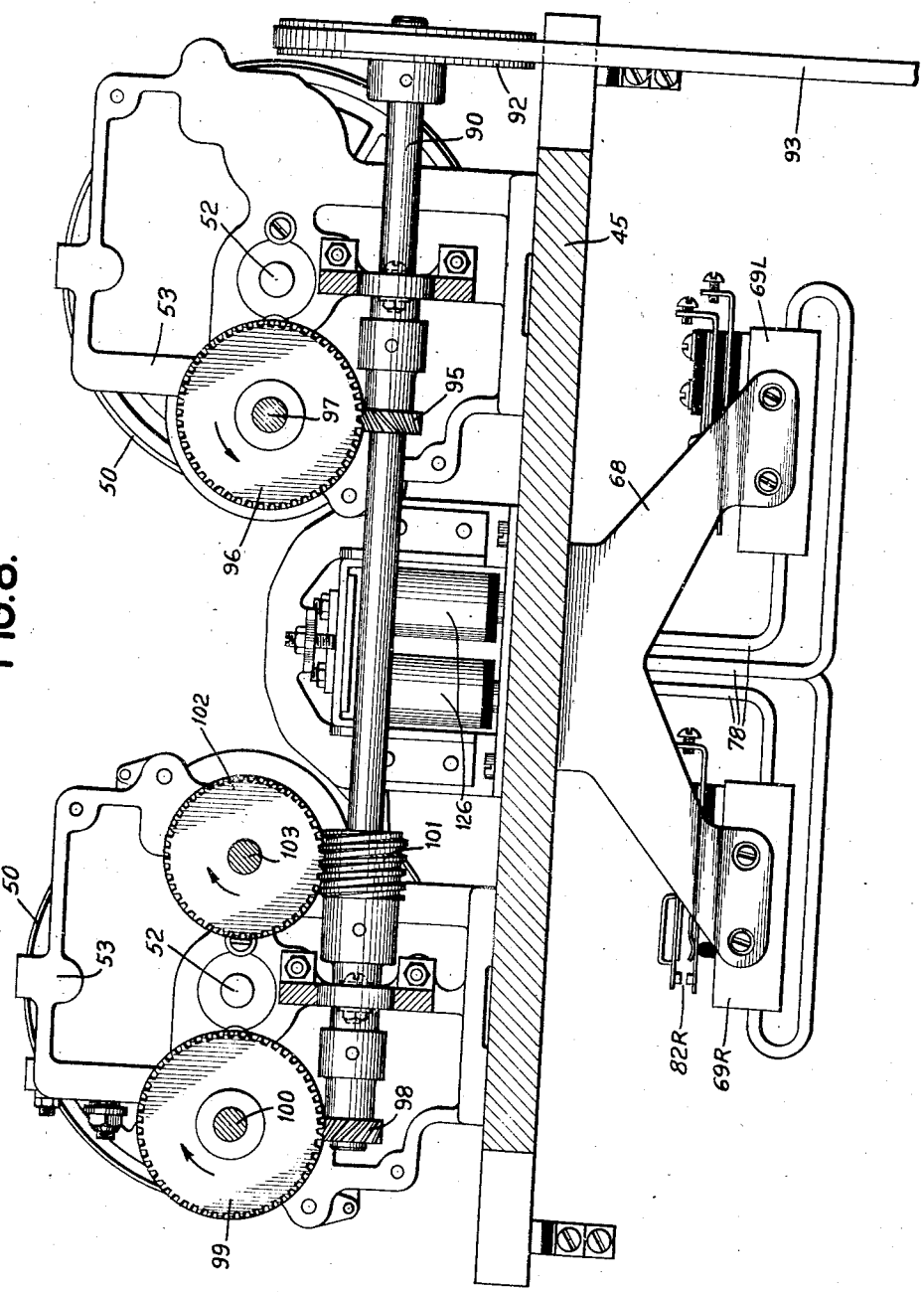

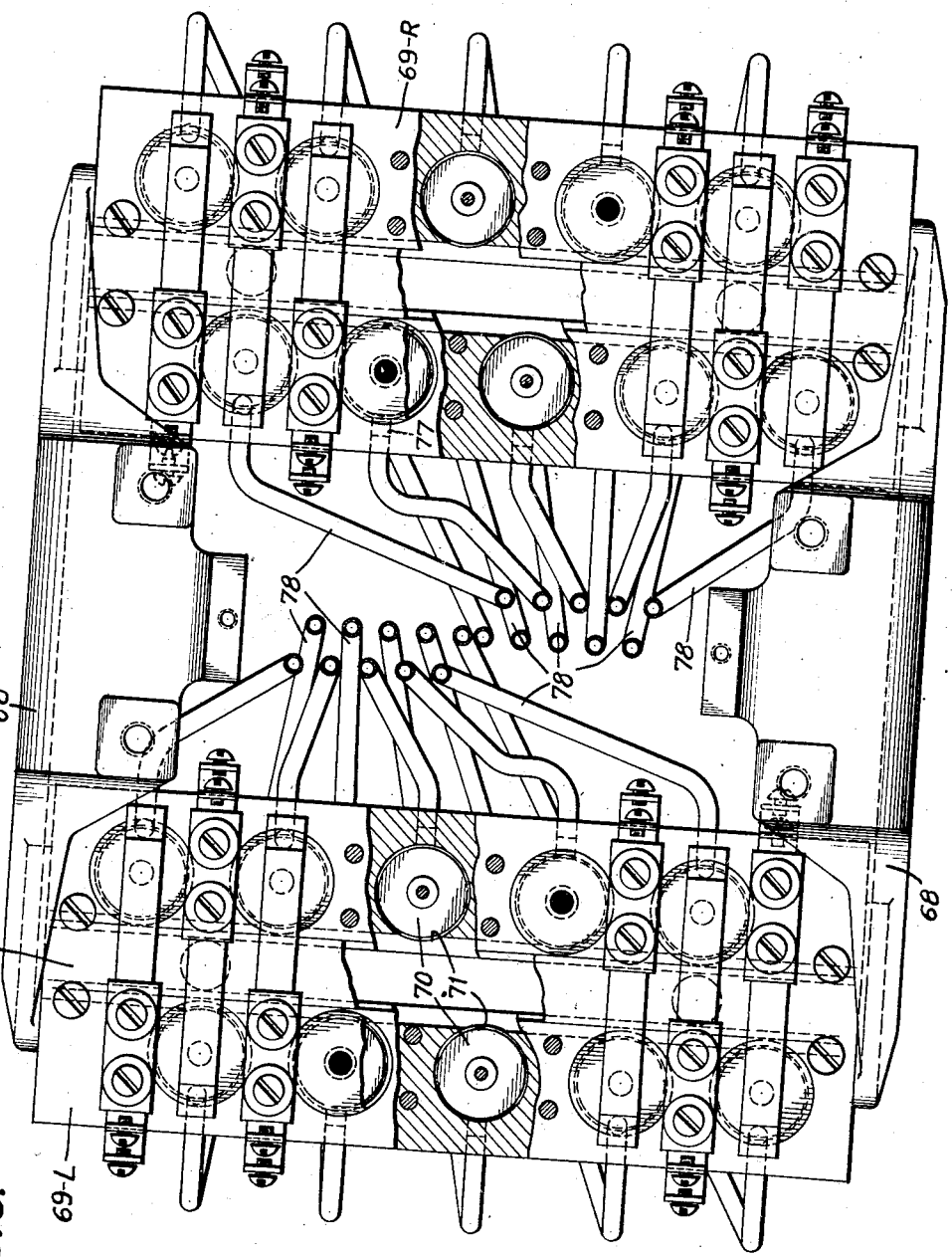

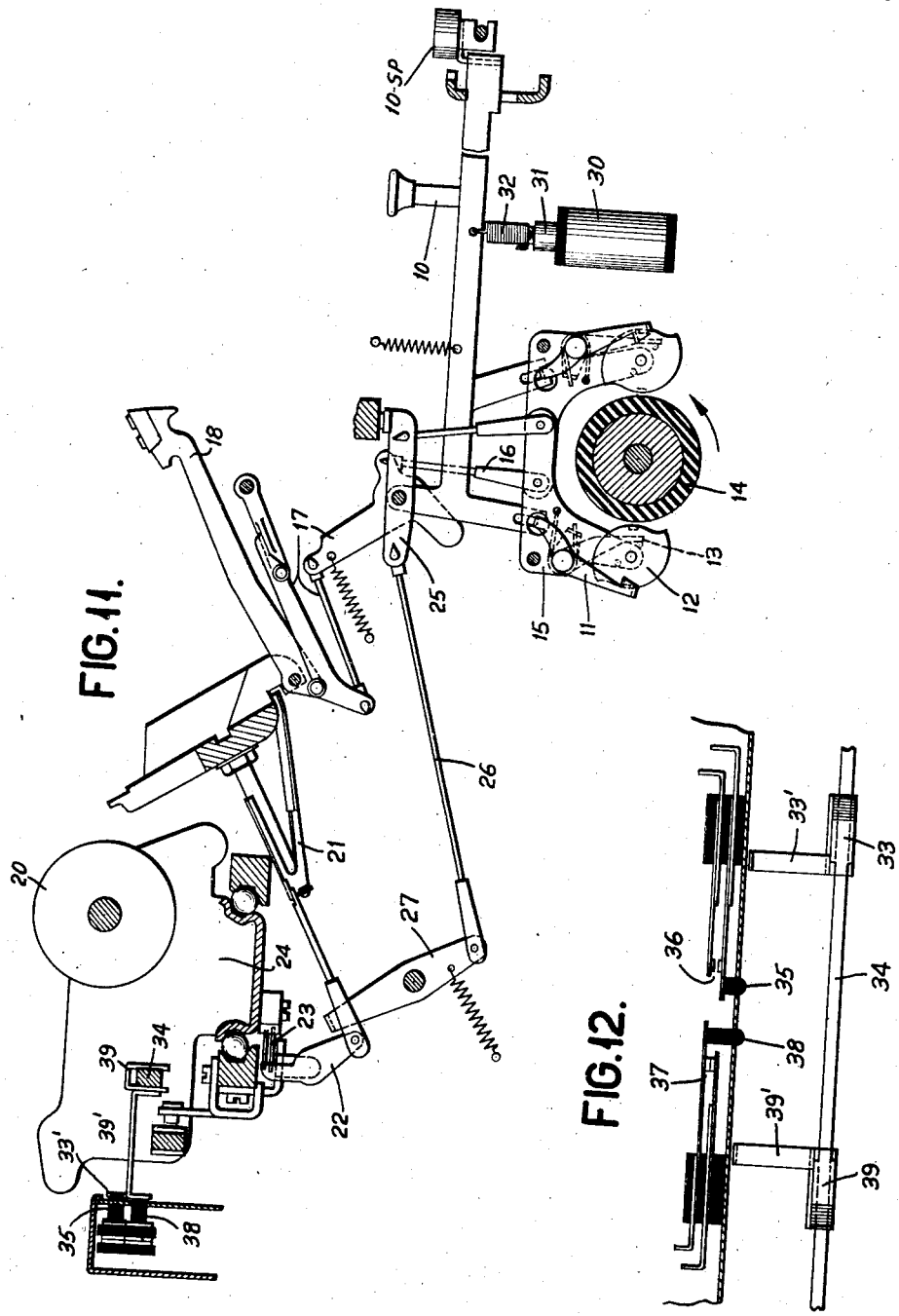

Oct. 6, 1942.   A. W. MILLS ET AL   2,297,789
TRANSCRIBING APPARATUS
Filed Nov. 4, 1939   15 Sheets-Sheet 10
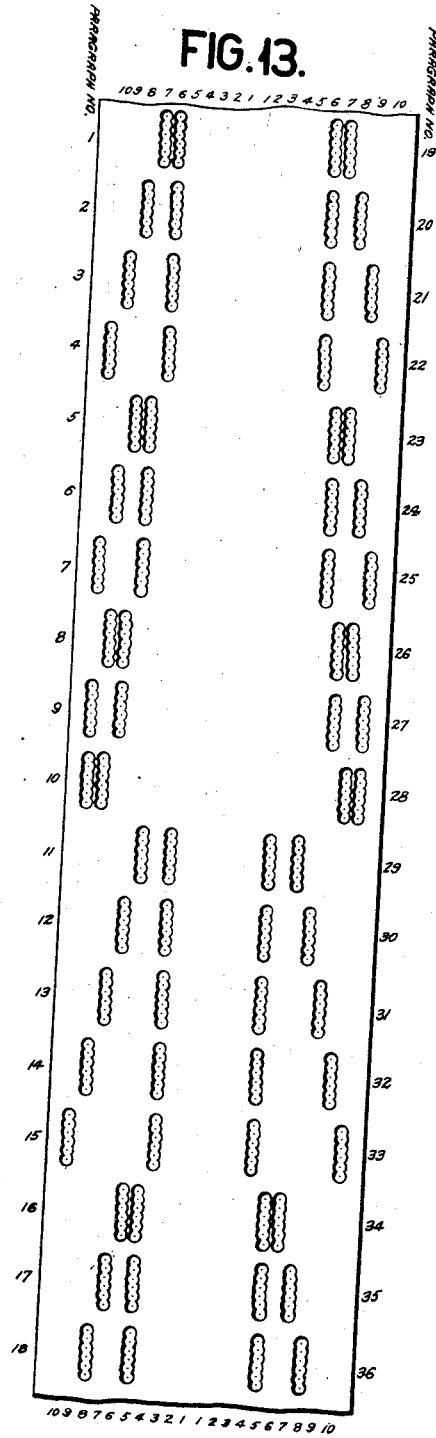
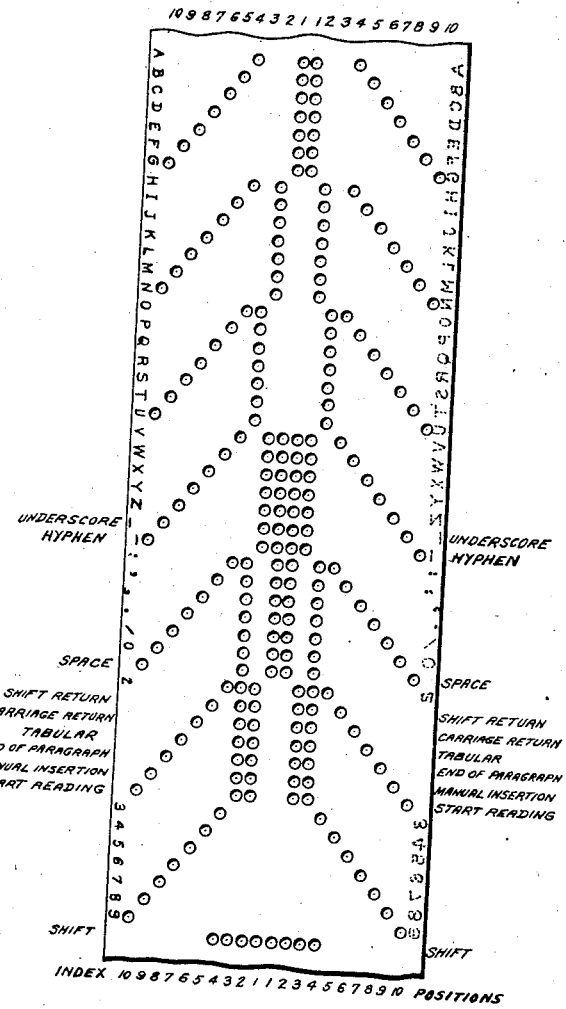

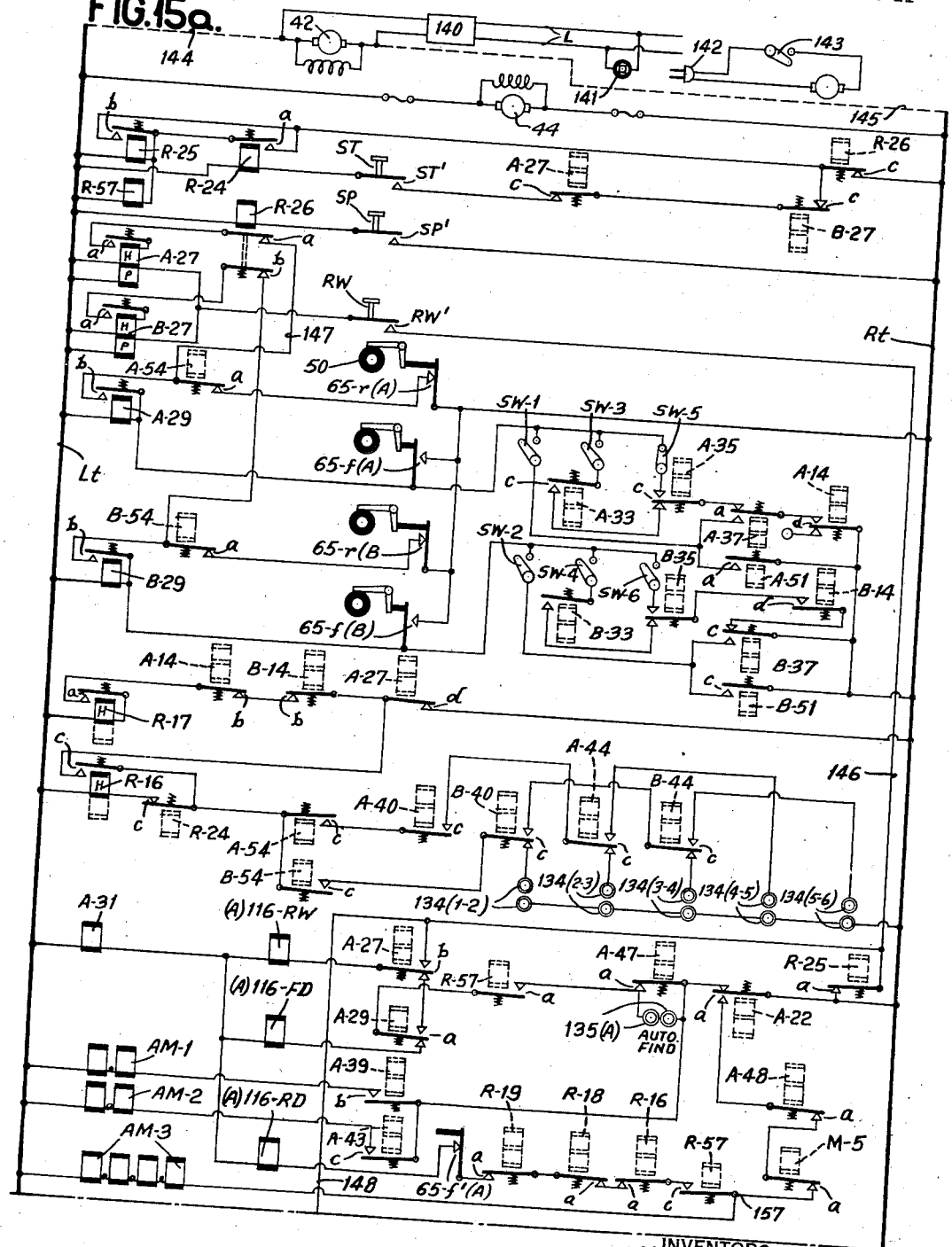

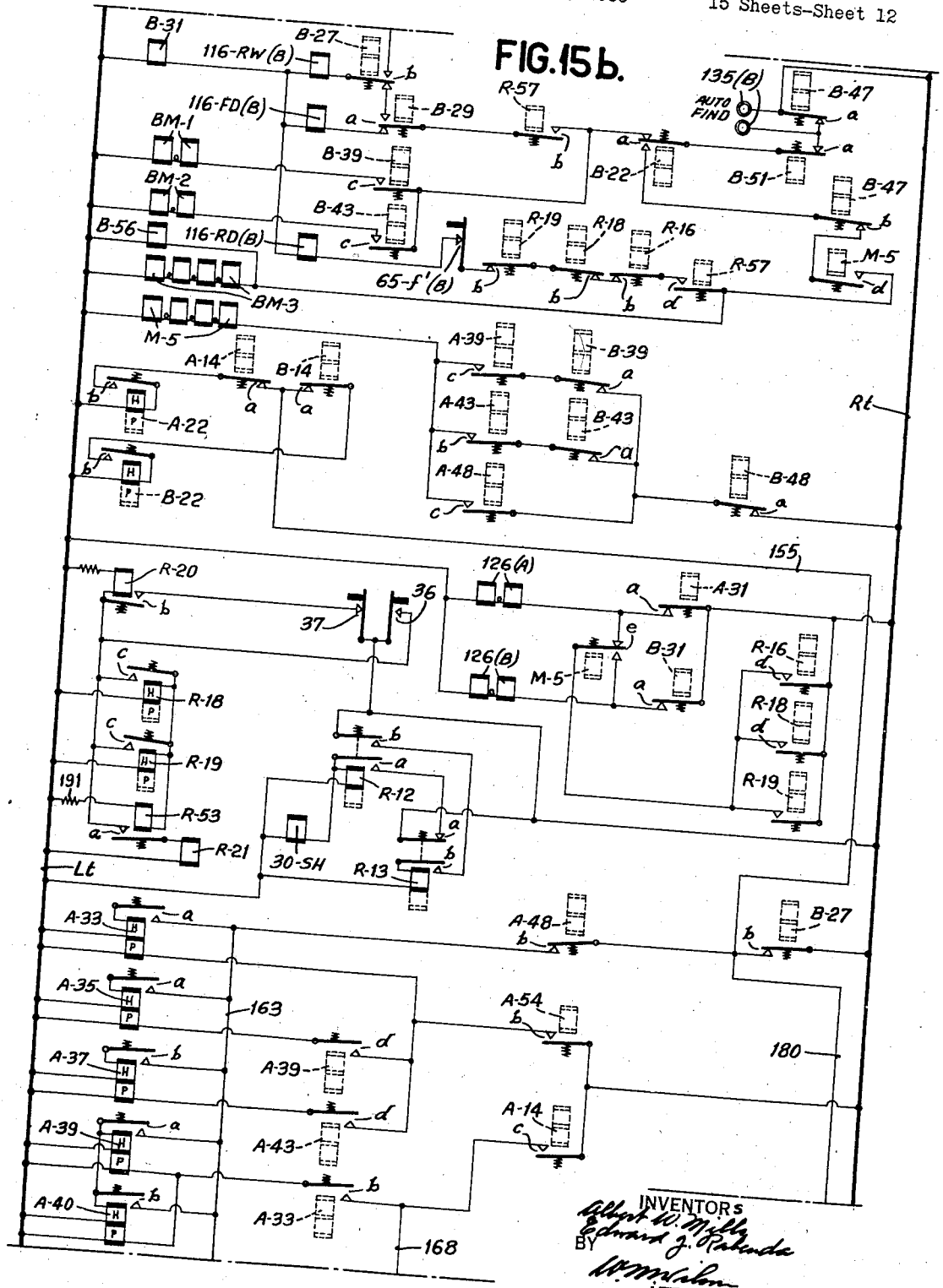

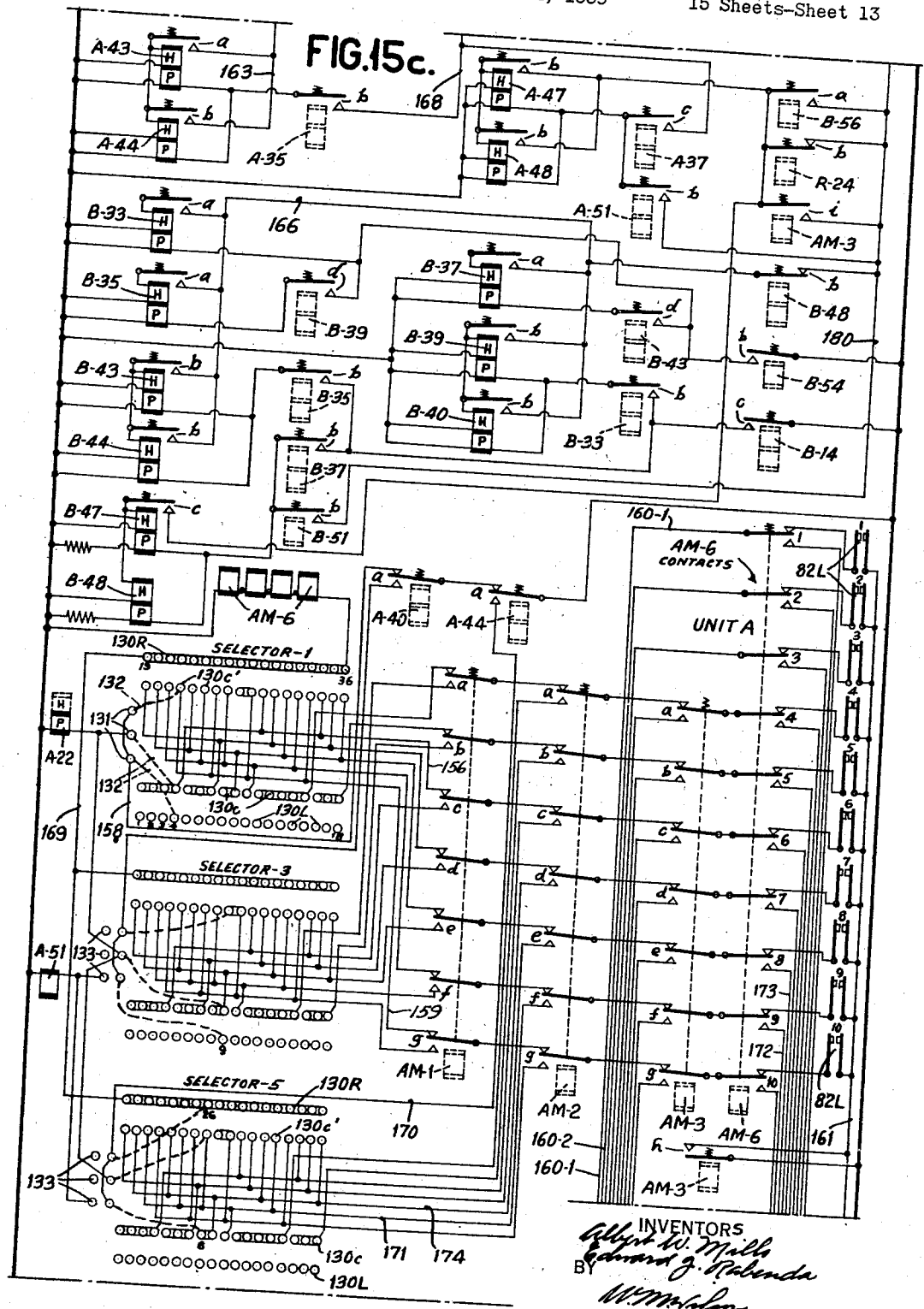

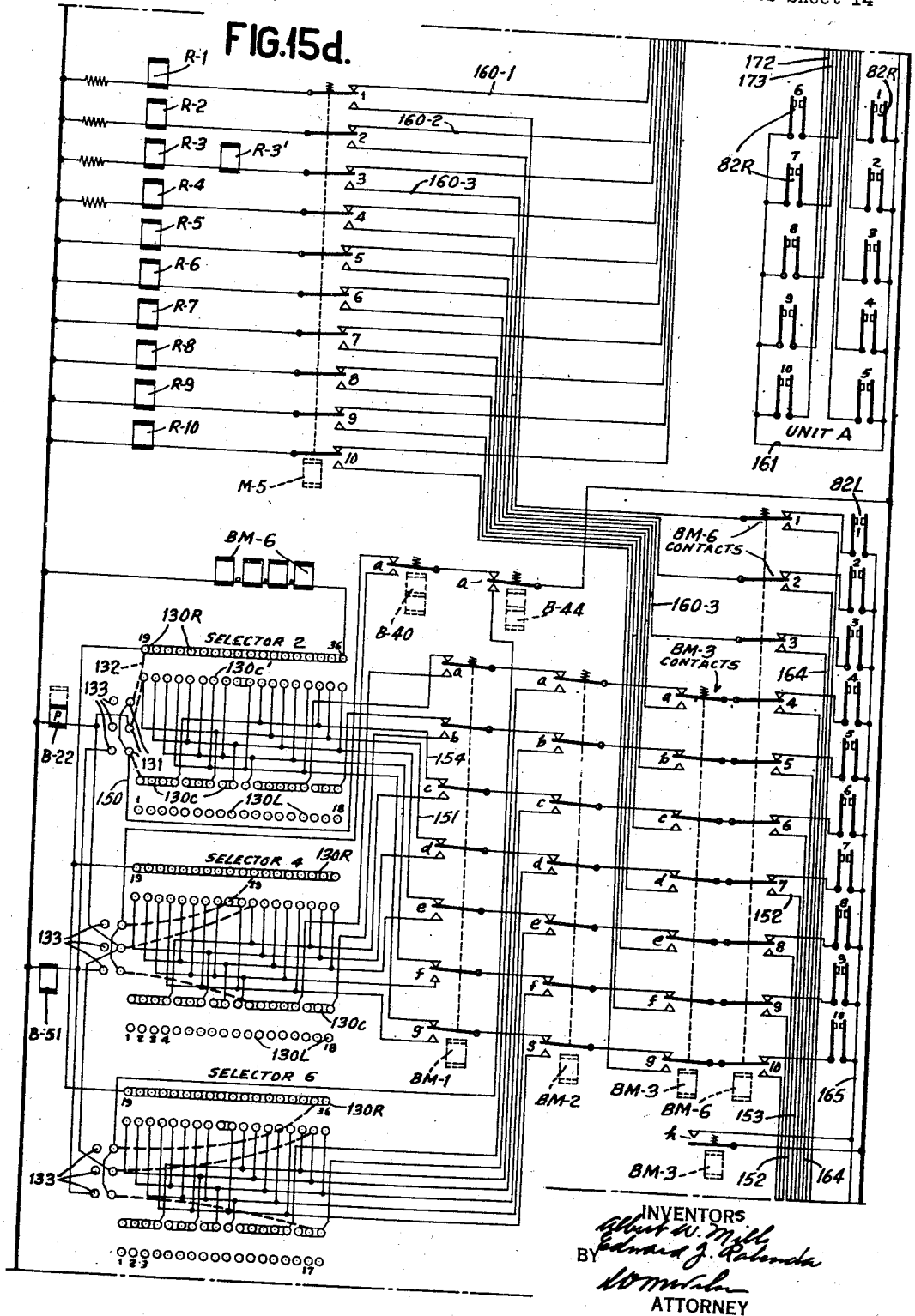

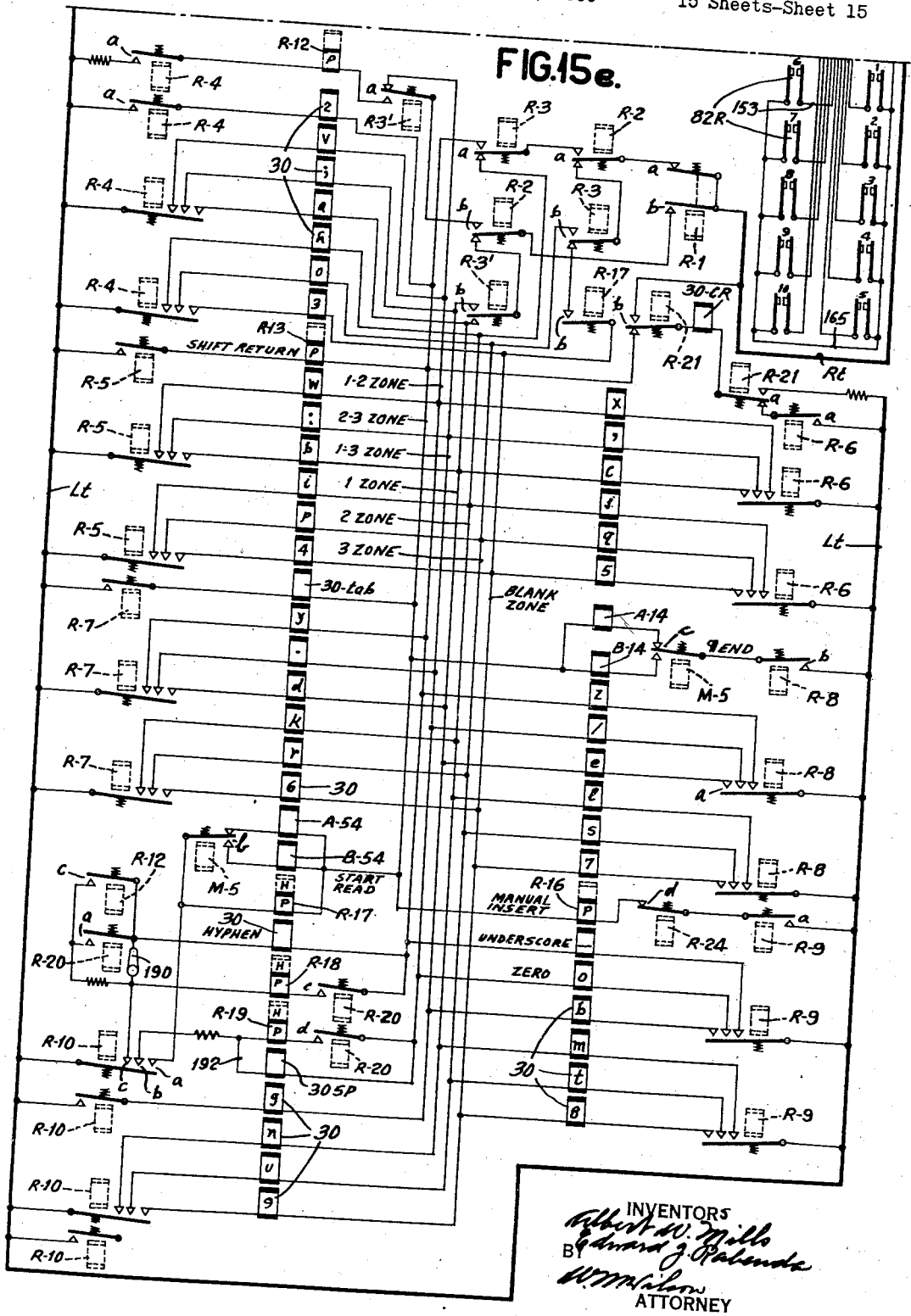

Patented Oct. 6, 1942

2,297,789

UNITED STATES PATENT OFFICE 2,297,789

TRANSCRIBING APPARATUS

Albert W. Mills, Endicott, and Edward J. Rabenda, Binghamton, N. Y., assignors to International Business Machines Corp., New York, N. Y., a corporation of New York Application November 4, 1939, Serial No. 302,884

18 Claims. (Cl. 197—20)

This invention relates to a data transcribing machine and is directed to improvements in the apparatus disclosed in an application of L. S. Harrison et al., Serial No. 133,762, filed March 30, 1937, and now Patent No. 2,199,541.

The general object of the invention is to provide a transcribing mechanism which is capable of greater flexibility and variety, than heretofore, in operation and in selection of record bodies for transcription.

The invention includes a plurality of record supplies, specifically record tapes, each supply having a plurality of successive record bodies or record forms, and an object is to provide means for selecting a series of variable numbers of these record bodies for transcription.

A further object is to provide means for selecting record bodies from the record supplies in variable order with respect to the supplies; that is, successive forms or record bodies may be taken from the same supply or alternately from different supplies for transcription.

Another object is to provide a plurality of selectors for pre-selecting interchangeably any of a plurality of the record bodies for transcription.

It is a further object to provide means for selecting a number of the record bodies for successive readout in a variable, preliminarily chosen sequence.

It is also an object to provide for automatic selection of one of a pair of successive record bodies after the other, regardless of whether the second body is in a position behind or ahead of the first body.

Another object is to provide means for pre-selecting a plurality of different series of record forms or bodies for successive transcription.

Stated in another way, the latter object is to provide means for splitting up the selection of a plurality of record bodies into successive series. Further, a related object is to provide for splitting up of the record bodies into various series, with each series having the same or a different number of record bodies.

The preselection of record bodies is controlled by settable selecting devices, and it is an object of the invention to provide means for enabling one or more of the selecting devices to be skipped.

The invention also contemplates the provision of means for presetting the controlling apparatus to automatically stop the transcription after any record body of a plurality of preliminarily chosen record bodies has been transcribed.

It is a further object to provide means for automatically returning a record body to transcribing position after having been once transcribed.

The apparatus includes means for transcribing data designated on record bodies located along different record decks of a plural-deck record tape or sheet. In connection therewith, a purpose of the invention is to provide means for rendering analyzing means selectively effective to read one or another of the record decks in accordance with which of the record bodies has been preselected for transcription.

The apparatus provides means for feeding a record tape in either of opposite directions to select record bodies thereof for transcription. It is another purpose of the invention to provide means for preselecting the direction of automatic feed of the record tape after the selection of one record body thereof in order to select the next chosen record body thereof.

It is still another purpose of the invention to provide means for automatically reversing the feed of the record tape, if a preselected record body thereof has not been found during its feed in the first direction.

The invention also embodies the provision of novel electro-pneumatic record analyzing means, involving pneumatics selectively controlled by designations on the records and having means for mechanically operating contacts which control the translation of the designations.

Among other objects, the invention also contemplates the provision of novel driving means for a record tape with means for braking the driving means before the tape is arrested.

The invention also includes the provision of optional carriage return means controlled by certain designations while the typewriter carriage is in a preselected end margin zone, with means for disabling, at will, the optional carriage return means.

General description

The invention includes a typewriter unit and a robot for controlling automatic operation of the typewriter unit in accordance with record designations. The robot has a pair of parallel units, each operating on a record tape. Each tape is divided lengthwise into two record decks. Each record deck is perforated with a plurality of successive record bodies or forms representing individual bodies of data to be transcribed. Each record body has an identifying symbol and the record bodies having certain identities are carried by one of the record decks of a tape while the record bodies having the other identities are carried by the other deck of the record tape. The robot includes means for feeding the plurality of record tapes, electro-pneumatic means for sensing the designations of the tape, means under control of the sensing means for translating the designations, and means controlled by the translating means for operating the typewriter to transcribe the designations. The robot further includes a selecting means which embraces a plurality of selecting devices in the form of plugboard sections which may be preliminarily plugged for variably choosing record forms from the different tapes for transcription. The selecting means may be plugged to skip one or more of the selecting devices; to stop the operation of the robot after any one of the selecting devices has completed its controlling operations; and to cause automatic re-selection of a record form after it has been transcribed. Associated with the selecting means are a plurality of switches, one for each selector device, which may be set for controlling the direction of feed of a record tape in hunting one chosen record form after the preceding selected form of the tape has been transcribed.

The two units of the robot may concurrently or sucessively feed their respective tapes in selecting or hunting chosen record forms, but only one of the units at a time is operated to read out a selected record body.

Other objects of the invention will be pointed out in the following description and claims and illustrated in the accompanying drawings, which disclose, by way of example, the principle of the invention and the best mode, which has been contemplated, of applying that principle.

Figure 3:
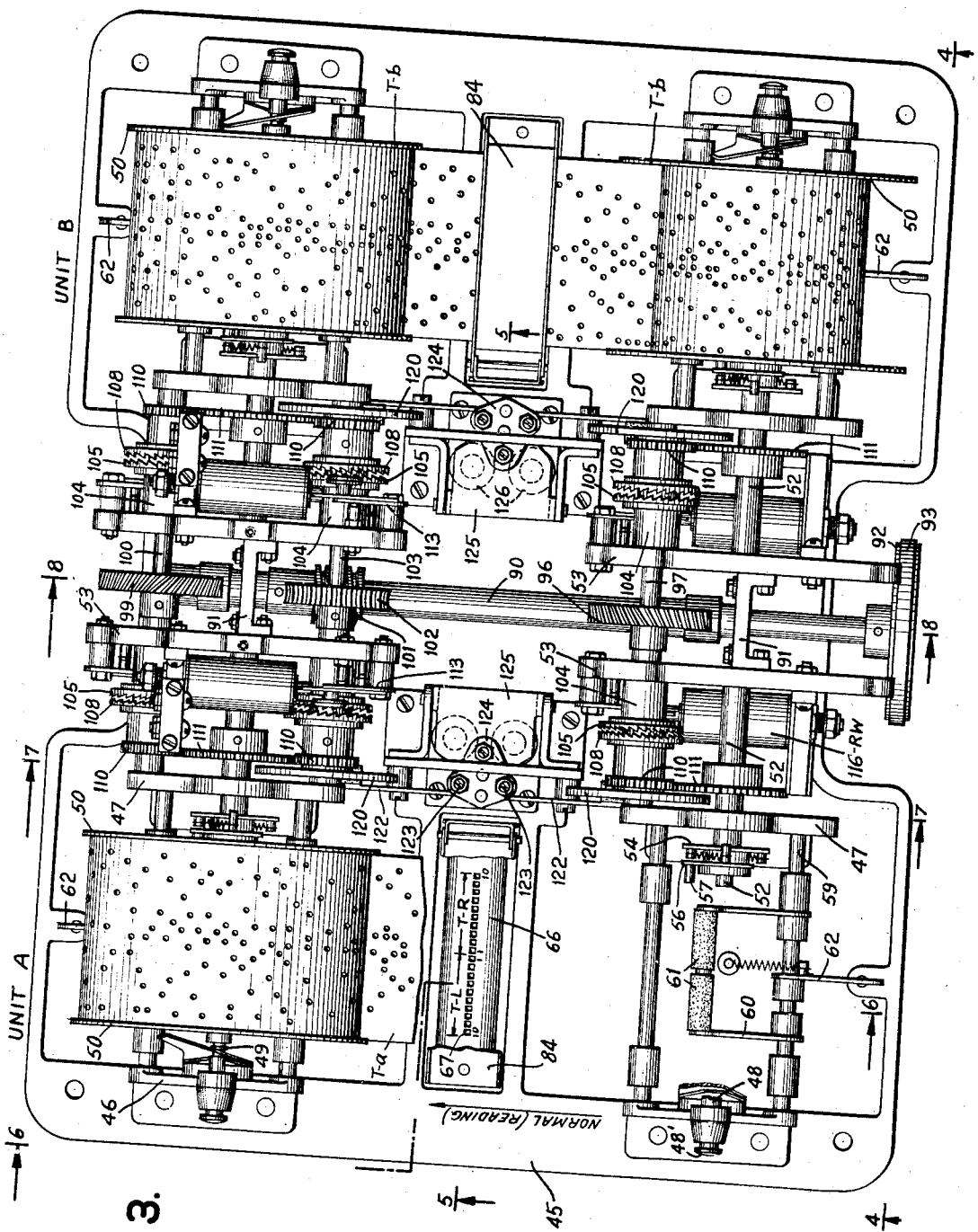
Fig. 3 is a plan view of the robot, with some parts removed.

Figs. 5, 6, 7, and 8 are sections, respectively taken along lines 5—5, 6—6, 7—7, and 8—8 of Fig. 3, Fig. 9 is a plan view, partly sectioned, of the pneumatic contact-closing assembly of one of the robot units, Fig. 10 is a fragmentary view of the plugboard, Fig. 11 is a vertical section through the typing unit, Fig. 12 is a plan sectional view of typewriter carriage-controlled switches, Fig. 13 shows a section of a record tape with the code for the paragraph identifications, Fig. 14 shows a section of the tape with the code for the characters and control functions, and Figs. 15a to 15e represent the circuits of the machine.

*The typewriter (Figs. 1, 2, 11, 12)*

The invention may be practiced with any suitable, known typewriter, but it is preferred to use the power typewriter known as the Electromatic, the general principles of which are disclosed in Patents 1,777,055 and 1,873,512.

The typewriter has the usual keys 10, which may be individually differentiated by supplementing the common reference number with a designation denoting the character or function associated with the key; thus, 10—*m* is the key for typing the letter *m*, 10—SP is the space bar, 10—CR is the carriage return key, 10—*tab* is the tab key, 10—SH is the upper case shift key, and 10—SHR is the shift return key. Depression of a key 10 releases a latch 11 from a cam 12, allowing a spring-pressed lever 13 to engage the cam with a motor-driven, constantly rotating shaft 14. The shaft rocks the engaged cam and its carrier 15 in a direction to depress a link 16, which through linkage 17 propels a type bar 18 towards a platen 20 to type the character corresponding to the depressed key. Near the end of its forward stroke, the type bar strikes a universal bar 21 acting, through a lever 22, to operate the escapement pawls 23 to cause letter spacing of the carriage 24 after the character is typed.

The space bar 10—SP acts through a cam 12, its carrier 15, a connected link 16, a lever 25, a link 26, and a lever 27, to rock the lever 22 for effecting letter spacing of the carriage.

The carriage return key 10—CR, when depressed, causes automatic carriage return and line spacing, and its depression, after the carriage has returned, merely causes line spacing. The automatic carriage return means is preferably as disclosed in Patent 1,955,614.

Tab key 10—*tab*, upon depression, causes automatic tab spacing of the carriage an amount determined by the usual settable tab stops. The automatic tab spacing means may be as in Patent 1,935,436.

Each key 10 may be either manually or automatically depressed. Its automatic operation is by a solenoid 30 acting, upon energization, through its plunger 31 and a link spring 32 connected to the key. Selective energization of the solenoids is controlled by the robot according to the codal indications, designations, or symbols on the record tapes. The solenoids may be differentiated by supplementing the common reference number 30 with the distinguishing designations of the associated keys.

The carriage return operation normally is controlled by a carriage return designation. The machine may be conditioned to effect, in addition, optional carriage return when a space or hyphen designation is sensed while the carriage is in a predetermined right hand margin zone. If the hyphen designation is sensed while the carriage is in advance of this zone, carriage return and typing of the hyphen do not occur, but if sensed while the carriage is in the margin zone, the hyphen is printed and the carriage returned. Similarly sensing of the space designation causes letter spacing if, at the time, the carriage is in advance of the margin zone, and causes carriage return if the carriage is in the margin zone. The means for obtaining these results includes an arm 33' extending rearwardly from the right hand margin stop 33 (Fig. 12). The stop is adjustable along the carriage rail 34 to vary the right hand margin limit and, incidentally, to vary the position of the right hand margin zone. This margin zone, in the present machine, covers eight letter spaces from the right hand margin limit, and the zone control is placed in effect when the arm 33' rides onto an insulating lug 35 projecting from a blade of a normally open switch 36 and closes the switch. The switch is closed momentarily and opens as the carriage continues its movement towards the right hand margin limit.

The zone control, once rendered effective, is maintained through a normally closed switch 37 which, as the carriage returns to the beginning of the line, is opened by coaction of an insulating lug 38 on a blade of the switch with the arm 39' extending from the left hand margin stop 39. The means for effecting optional carriage return will be more fully explained later.

The record tapes (Figs. 13 and 14)

The machine uses two record tapes T—a and T—b (Fig. 3) which are interchangeable and replaceable. Each tape is divided lengthwise into two record decks, each occupying half the width of the tape and provided with index positions 1 to 10 to be punched with codal indications of data and control functions. An individual body of data is represented by successively punched codal indications which include an identification symbol for the body of data. The succession of codal indications representing a body of data may be referred to as a designation or record body, record form, record, record section, paragraph, or the like. The left hand deck of each tape is to be punched with designation bodies bearing identifications "1", "2" ... "17", and "18" only, while the right hand deck is to be punched only with the designation bodies bearing identifications "19" to "36". The first codal indication of a record body is the identifying designation. The next is always a start read designation which is the same for each record body. Following the start read designation, the record body has the successive designations representing the body of data to be automatically transcribed. The last designation of each record body is an end of paragraph designation, which is the same for each record body.

Fig. 13 shows the code for the identification symbols, and Fig. 14 shows the code for the characters and control functions.

The index positions 1, 2 and 3 may be referred to as zone points, one or more of which is common to the symbols of the characters and functions, excepting the digits 3 to 9 and the form identifications. The index positions 4 to 10 may be referred to as the intrazone points. The digits 3 to 9 are respectively represented by singly perforating a column in intrazone points 4 to 10, and the form identifications by perforating different combinations of two of the intrazone points 5 to 10. Other than digits 3 to 9 and the form identifications, each of the designations includes one intrazone point plus one or more zone points.

As indicated in Fig. 13, record form identifying symbols "1" to "18" are the same, respectively, as symbols "19" to "36", but the former group lies within the left record deck and the latter group within the right deck. Thus, the paragraph identifications are differentiated not only by their codal representations or symbols but also by the location of the symbols with respect to the record sheet; specifically, by the location of the symbols in one or another of the record decks.

The division of the tape into two record decks makes it possible to use a tape which is half as long as would be necessary were the same number and substance of record forms to be recorded along a single record deck. The selection of a record form, as will be brought out later, requires the feeding of the tape to bring the form to a sensing station. Hence, the time required for the selection of a record form on the double deck tape is considerably less than would be required for selection of a corresponding form were the tape of single deck width, and the operation of the machine, as a whole, in transcribing data is more rapid because of this saving of time.

The body of data represented on a record form may comprise any desired material such as a name and address, or a paragraph of a letter or the like. A typical record form has the following successive designations:

(a) The paragraph or form identification. The preliminary choice of a record form to be decoded is brought into effect as a completed selection by the sensing of the paragraph symbol. To given sufficient time for the functions controlled by the sensing of the chosen paragraph identifying designation to be performed, eleven columns are skipped after the paragraph symbol.

(b) The start read designation, the function of which will be explained later. Four column spaces are skipped after the start read symbol.

(c) The carriage return symbol followed by eight blank column spaces.

(d) A tab spacing symbol to provide the paragraph indentation. Several column spaces are skipped after the tab designation.

(e) A shift symbol, which causes the first letter to be capitalized. Four column spaces are then skipped.

(f) The designation of the first letter of the paragraph.

(g) A shift return code, causing return to lower case, followed by four blank columns.

(h) The columns of successive representations of the characters and other functions forming the substance to be transcribed.

(i) A final carriage return designation.

(j) An end of paragraph designation, which stops reading out of the record form and initiates reading out of another selected record form.

A manual insert designation may be provided within the record form in order to interrupt the operation of the robot and to permit the operator to type in variable matter such as names, dates, amounts, or the like.

When the machine is conditioned for optional carriage return under control of the space and hyphen designations, a tape is used on which a hyphen designation is inserted between the designations representing syllables of each word. A tape so perforated may be referred to, for convenience, as a hyphenated tape. The hyphen symbol is ignored if sensed while the typewriter carriage is in advance of the predetermined right hand margin zone. If, however, it is desired to type a hyphen under control of the hyphen designation, regardless of the intraline position of the carriage, the hyphen designation is preceded by an upper case shift designation and followed by a shift return designation. The hyphen type bar, in this case, is adapted to type a hyphen when in either upper or lower case position.

The machine operates under control of two tapes T—a and T—b (Figs. 1, 2, and 3), and means are provided to determine the order of reading out of selected record forms. A series of record forms chosen from each tape may be selected and transcribed in succession on a sheet in the typewriter. The series always starts with a form from tape T—a. When duplicate tapes are used, thirty-six different bodies of matter may be selected from, but these may be typed and appear in any order on the sheet. When the two tapes are not duplicates, seventy-two different data bodies may be selected from, but matter represented on tape T—b can never appear first on the sheet. Thus, duplicate or non-duplicate tapes will be used, depending on whether maximum flexibility in order of occurrence of the represented matter is desired or a maximum number of different data bodies is desired. The maximum number of forms comprised in a series to be transcribed in automatic succession on a sheet in the typewriter is three from each tape, or a total of six, transcribed in alternation from the two tapes. A series of less than six forms may be selected for automatic successive transcription on a sheet and the series may comprise one to three forms taken from tape T—a, or one form from tape T—a and three from tape T—b, and still other variations, as will be made clear later.

The robot

The term "robot" may be applied to the means for controlling the typewriter to type the matter represented on the record forms or paragraphs of the tapes. The robot may be considered as divided into two parts; one, the record reading means in which are included the means for supporting the tapes, feeding them, and reading and translating their designations; and two, the preliminary selector for preliminarily selecting or choosing the record portions or paragraphs of the tapes to be read out.

*The record reading means.*—This is mounted inside the desk 1 on a built-up frame 41 (Figs. 1 and 2), the base of which supports a motor 42, a vacuum pump 43 driven by the motor, and a generator 44 driven by the motor and designed to supply 110 volts, D. C. to the magnets and relays of the robot. When the machine is used in locations having a service supply of 110 volts D. C., then the generator is unnnecessary and may be disconnected. Mounted on top of frame 41 is a base casting 45 supporting two similar, parallel units A and B (see Figs. 1 to 8), respectively acting on tapes T—a and T—b.

Each unit has a pair of outer standards 46 and companion inner standards 47 mounted on base 45. The outer standards carry slidable plungers 48, each rotatably provided at one end with a bearing 49 for journaling the outer flange of a tape spool 50. A pivoted spring-pressed flat bar 51 acting on the rear shouldered portion of bearing 49 urges the plunger 48 inwardly. The inner flange of the spool 50 is journaled on one end of a short shaft 52 rotatably mounted in a standard 47 and an adjacent standard 53. Fixed to shaft 52 is a disk 54 connected by springs 55 to a disk 56 rotatably carried by the shaft. The shaft thus yieldably rotates the disk 56. A driving stud 57 projecting from the face of disk 56 is receivable in any of the holes 58 of the inner flange of the spool (see Fig. 6), to couple the spool for rotation with the shaft 52. The plunger 48 may be manually retracted by means of bar 51 to enable the spool to be inserted in place or removed.

Figure 5:
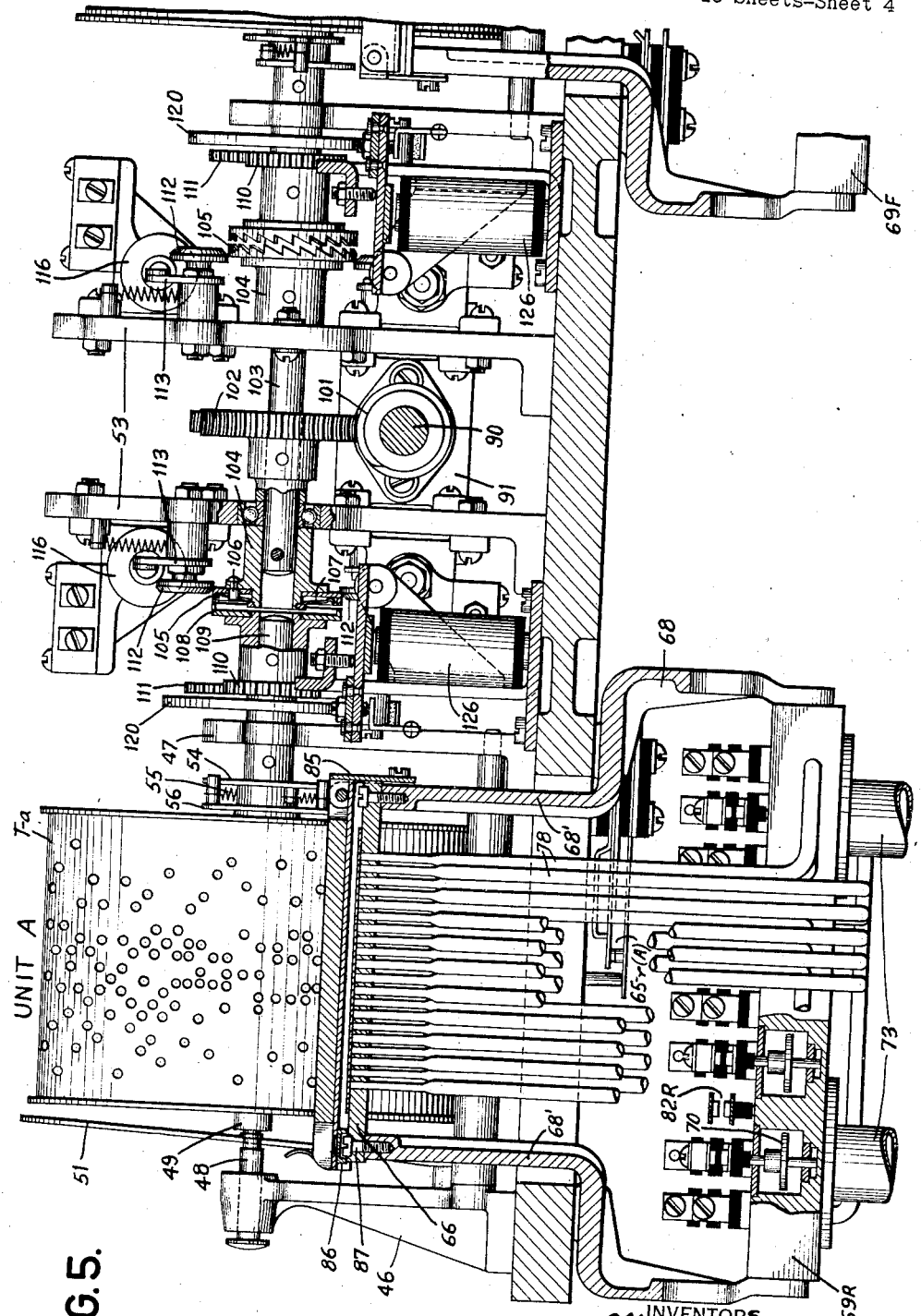

There are two spools 50 for each unit (Fig. 3), the front spool being the one on which the tape is wound when out of the machine. The end portions of the tape are left unperforated and are not intended to bear any designations so that the first and last record forms, sections, or paragraphs of a tape may be fed, in either direction, past the designation sensing station of the unit without removing the tape from either spool. Means are provided to respond to the depletion of the record bearing length of the tape from either spool. This means comprises a shaft 59 below each spool and journaled in the standards 46 and 47 supporting the spool. Fixed to the shaft 59 is a bail 60 carrying rubber rollers 61 which are urged to follow the tape roll by a spring 62 connected to an arm 63 fixed to shaft 59 and extending oppositely to bail 60. The free end of arm 63 abuts a push rod 64 of insulating material. The push rod 64 associated with each of the rear spools rests on a lower spring blade of a normally closed switch 65—r (Figs. 5 and 6). When the tape has been unwound from the rear spool to about the last three turns, the spring 62 has moved the assembly of shaft 59, rollers 61, and arm 63 to a position such that the arm has depressed the associated push rod 64 sufficiently to open contacts 65—r. As will be brought out later in the description of the circuits and operation of the machine, the opening of contacts 65—r of a unit causes the unwinding of tape from the rear spool to stop. This occurs after the punched portion of the tape has left the rear spool and before the unpunched, clearance section has been completely removed from the spool.

Figure 4:
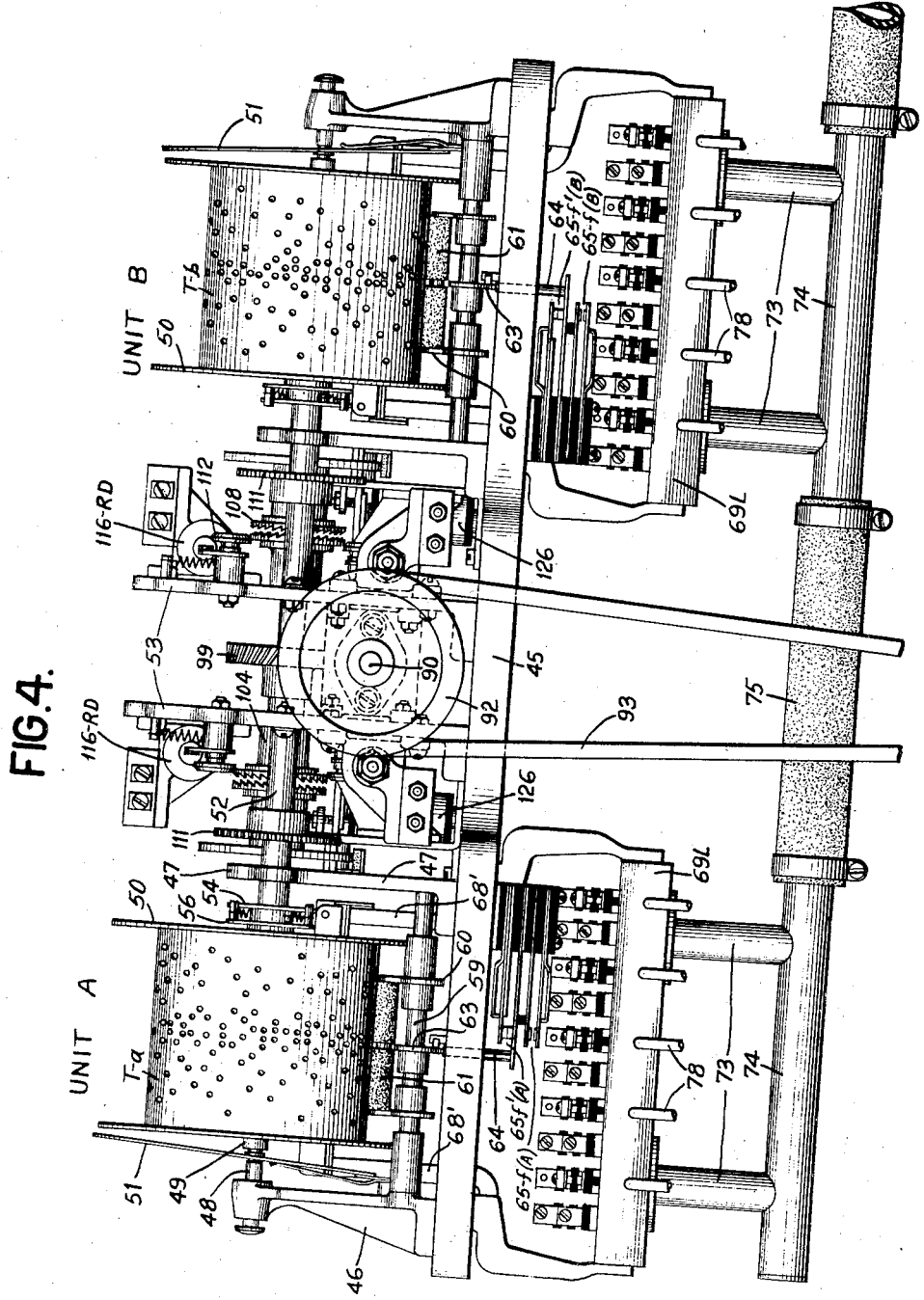
Fig. 4 is a front view of the robot, taken along lines 4—4 of Fig. 3.

The push rod 64 associated with each front spool rests on the lower blade of an upper, normally closed switch 65—f' (Fig. 4). Below switch 65—f' is a normally open switch 65—f, the upper blade of which carries an insulating stud 65' abutting the lower blade of the upper switch 65—f'. When the tape has been unwound from the front spool to about the last three turns, the associated arm 63 has succeeded in depressing the push rod 64 sufficiently to open the upper switch 65—f' and to close the lower switch 65—f. As will be brought out later, the opening of the upper switch prevents reading out of the tape, while the closing of the lower switch stops unwinding of the tape from the front spool.

It may be noted that, incidentally to the sensing of the size of the tape roll on a spool, the associated rollers 61 help to keep the tape convolutions snug on the spool while being wound or unwound.

*The designation analyzing means.*—The tape passes from one spool of a unit to the other spool of the unit over a pneumatic tracker board 66 having a single row of twenty holes 67, the ten holes at the left being adapted to register with perforations in the ten index positions of the left hand record deck of a tape and the ten holes at the right with the index positions of the right hand deck of the tape. For convenience, the left half of the tracker board, with its ten holes, may be referred to as the left sensing track T—L (Fig. 3) and the right half as the right sensing track T—R. The tracker board of each unit bridges two upwardly extending arms 68' of a pair of inverted Y-shaped yokes 68 rigidly fastened to the base casting. The dependent legs of the pair of yokes 68 of each unit support between them a pair of cylinder blocks 69—L and 69—R (see also Fig. 9) located below the base casting 45. Each cylinder block has ten cylinders within which are the slidable pistons 70. The piston plate 70' is of less diameter than the cylinder to provide clearance serving as a bleeder vent. Each cylinder has a scavenger port 71 which is located above the normal, rest position of the piston plate 70'. All the ports 71 of a cylinder block open into a central passage 72 which, at the bottom, is connected to two vertical ducts 73 (particularly see Figs. 2 and 4) which lead into a single pipe 74. The two pipes 74 of the corresponding cylinder blocks of the two units A and B are connected by a coupling 75, and from the pipe 74 of unit B a connection is made to a vacuum tank 76.

The tank 76 is connected to the vacuum pump 43 which keeps the interior of the tank below atmospheric pressure. This vacuum system exhausts the air from the cylinders through the ports 71, and the pressure on the opposite sides of the piston plate is equalized because the clearance between the plate and the cylinder walls permits the air to be bled from the underside of the piston plate. Below the piston plate, the cylinder is formed with a port 77 into which the lower end of a tube 78 fits. The upper end of the tube fits into the tracker board 66 in communication with one of the perforation sensing holes 67. Then ten holes 67 in the left track T—L communicate through tubes 78 with the pneumatics in cylinder block 69—L and the ten holes in the right hand track T—R communicate with the penumatics in cylinder block 69—R. When an unperforated portion of the tape is above a hole 67, it is shutting off the connected cylinder from the atmosphere and the piston is in lower position. When a perforation in the tape comes above the hole 67, air rushes through the exposed hole and connected tube 78 into the cylinder space below the piston plate 70', lifting the piston plate to a position exposing the port 70 to the cylinder space then below the piston. This allows paper lint rubbed off the surface of the tape to be forced by the rush of air through port 70 and eventually into the vacuum tank 76, thus maintaining the surface of the tape clean and preventing the accumulation of waste matter inside the cylinder.

The upper end of the piston rod projects externally above the top of the cylinder and is provided with an insulating tip 79 engaged with the underside of a spring blade 80 which is urged by its own inherent resiliency and by a spring leaf 81 to remain in normal, lower position. The blade 80 carries one of the points of contacts 82, the other point of which is carried by a spring blade 83. When the piston is raised by atmospheric pressure, acting on the underside thereof, the tip 79 of the piston lifts blade 80 to close contacts 82. The closure of a particular pair of contacts 82 is a manifestation of the sensing by the tracker board of a perforation in a particular index position of the tape. When the perforation passes the tracker hole 67, the cylinder is again closed to the atmosphere, and the air is exhausted through the port 70 and the bleeder clearance between the piston plate and cylinder walls. The atmospheric pressure on the piston tip 79 is sufficient of itself to cause the piston to return to lower position, permitting contacts 82 to reopen. This action is assisted, in the present case, by the weight of the piston and by the tendency of the spring blade 80 to return to normal position. To distinguish the contacts 82 supported by the left cylinder block and controlled by the left track of a unit from the contacts 82 associated with the right track of the unit, the former contacts are characterized as contacts 82L and the latter contacts as contacts 82R.

A cover 84 for each tracker board is hinged at one end to an angle piece 85 fastened to the inner one of the pair of upright arms 68' of each unit. The free end of the cover 84 is provided with a socket 86 adapted to fit with a tight friction grip over the head of the bolt 87 which fastens the tracker board to the outer one of the pair of arms 68'. Secured to the cover 84 is a plate 88 (Figs. 5 and 6) formed with a pair of ribs 88' holding the tape down as it passes over the tracker board.

The portion of the tracker board of a unit embracing the row of sensing holes 67 may be considered as the sensing station of the unit. The tracker board, sensing holes 67, the tubes 78, the connected pneumatics, and contacts 82 may be considered as an electro-penumatic record analyzing means.

*Tape driving means.*—The data designations are read out of the tape during its feed from the front to the rear spool and the direction of this feed may be referred to as the normal direction. The tape is rewound by feeding it from the rear to the front spool and the direction of rewind of the tape may be characterized as the rewind direction. The paragraph identifying designations may be read out during feed of the tape in either direction to enable a desired paragraph to be selected by movement of the tape through the shortest possible distance. The rewind feed is effected by rotation of the front shaft 52, coupled to the front spool, while the feed in the normal direction is effected by rotating the rear shaft 52, coupled to the rear spool. Only one of the shafts of a unit is driven at one time, and clutch means are provided for selectively connecting the shafts of a unit to driving mechanism.

The feed in the normal direction when reading out designations is at a comparatively slow, reading speed sufficient to insure accurate sensing and transcribing of successive designations. To save time, the tape is fed at higher speed, nine times normal in the present instance, during the seeking or finding of a preliminarily chosen paragraph. The search for the preliminarily chosen paragraph is completed when its identifying designations are sensed and, for this reason, the identifying perforations are elongated (Fig. 13) to provide sufficient time for their accurate sensing during high speed finding movement of the tape. The seeking and finding of the preliminarily chosen paragraph may take place during feed of the tape in either normal or rewind direction. Incidentally, the rewinding of the tape without paragraph selection is also desirably effected at high speed. The rewinding of the tape is effected by rotation of the front spool at high speed. The movement of the tape in the normal direction is effected by rotating the rear spool, and since the tape is fed in the latter direction at slow speed during reading out and transcribing of designations of a selected paragraph and at high speed during seeking and finding of the paragraph, means are provided to effect either low or high speed rotation of the rear spool.

The means for rotating the spools will now be explained in detail. Between the units A and B is a main drive shaft 90 journaled in bearings carried by cross pieces 91 bridging each pair of transversely spaced standards 53 (see Figs. 3, 5, and 8). The front end of the main shaft has a pulley 92 (also see Figs. 2 and 4) driven through a belt 93 from a pulley 94 on the shaft of motor 42. As particularly indicated in Figs. 3 and 8, shaft 90 is provided with a front helical gear 95 meshed with a helical gear 96 fixed to a cross shaft 97 journaled in the front pair of standards 53. At the rear end, shaft 90 has a helical gear 98 meshed with a helical gear 99 on a cross shaft 100 journaled in the pair of rear standards 53. Between the helical gears 95 and 98, drive shaft 90 has a worm 101 (also see Fig. 5) meshed with a worm wheel 102 fixed to a shaft 103 also journaled in the rear standards 53. The direction of inclination of the teeth of gears 98 and 100 and of worm 101 and worm wheel 102 is opposite to the direction of inclination of the teeth of gears 95 and 96, so that shafts 100 and 103 are driven clockwise (Fig. 8) while shaft 97 is driven counterclockwise. The ratio of the helical pairs 95—96 and 98—99 is the same and such as to cause the shafts 97 and 100 to be rotated at finding speed which is nine times the normal or reading speed of shaft 103. Through clutch connections, to be described shortly, shaft 97 rotates front spools 50 to effect feed of the tapes in a rewind direction at high speed and may be referred to as the rewind shaft, shaft 100 rotates the rear spools to feed the tapes in forward direction at high speed and may be referred to as the forward find shaft, and shaft 103 rotates the rear spools to feed the tapes at normal speed in the forward direction and may be referred to as the read shaft.

Pinned to the opposite ends of shafts 97, 100, and 103 (particularly see Figs. 3 and 5) are collars 104 which, at their outer ends, carry face clutch disks 105. The disks 105 are connected by pins 106 to the collars 104 for rotation therewith, and, at the same time, are capable of limited outward movement on the pins against resistance of spring washers 107. Confronting each of the constantly rotating drive clutch disks 105 is a companion clutch disk 108 fixed to one end of a short shaft 109 journaled in a standard 47 and carrying, at the opposite end, a gear 110. Gear 110 meshes with a gear 111 fixed to the shaft 52 which, as explained before, has yieldable drive connections to a tape spool 50. Thus, when a clutch disk 105 is engaged with the companion clutch disk 108, the associated spool 50 is set in rotation and continues rotating until the clutch disk 105 is disengaged from the companion clutch disk.

Engaging the rim of each clutch disk 105 is a beveled roller 112, (see Figs. 5 and 7) rotatably carried by one arm of a bell crank lever 113, the other arm of which is connected, through a link 114, to the plunger 115 of a solenoid 116. Energization of the solenoid causes the connected roller 112 to cam the clutch disk 105 outwardly, into mesh with the confronting clutch disk 108, thereby setting the spool, associated with the clutch, in rotation to feed the tape.

The solenoid 116 energization of which couples the front, rewind shaft 97 to the front spool may be referred to as the rewind clutch solenoid 116—RW; the solenoid which couples the intermediate, read shaft 103 to the rear spool to effect the slow speed of the tape for reading and transcribing operations may be referred to as the read clutch solenoid 116—RD; and the solenoid which couples the front shaft 100 to the rear spool may be referred to as the forward find clutch solenoid 116—FD.

Only one of the three clutch solenoids of a single unit is energized at one time. The two forward find clutch solenoids of the two units A and B or the two rewind clutches of the two units may be energized simultaneously to cause concurrent feed of the two tapes in either direction to select a paragraph from each tape to be read out. The selected paragraphs are read out and transcribed one after the other and, accordingly, only the read clutch solenoid of one of the two units may be energized at one time. The means to energize the solenoids will be explained later in connection with the circuits.

The selection or finding of a paragraph on a tape is carried out during its high speed movement in either forward or rewind direction, and the selection is completed when the paragraph identifying designations are sensed. Means are provided to prevent overrunning of the tape when the paragraph selection has been completed and, for this purpose, brake means come into operation upon the disengagement of the high speed clutches in order to brake the means driven by the clutches and, thereby, positively to arrest the feed of the tape. The brake means comprises a brake wheel 120 (Figs. 3, 5, and 7) fast to the shaft 109 of one of the gears 110 which drives the gear 111 of the shaft 52 of the rear spool, and a brake wheel 120 fast to the shaft 109 which carries the gear 110 meshed with gear 111 of the shaft 52 of the front spool. Engageable with the brake wheel is a brake band 121 on one arm of a lever 122. The two brake levers 122 of each unit extend oppositely, and their rear arms, or the arms opposite the brake arms, extend towards each other, with their free bent ends abutting screws 123 adjustably carried by a common plate 124. This plate is rigidly fastened to the pivoted armature 125 of a double coil magnet 126. A spring 127 connecting the two adjacent rear arms of levers 122 normally holds the brake means ineffective. When magnet 127 is energized, its armature 125 rocks downwardly, causing the screws 123 of plate 124 to rock the levers 122 simultaneously in opposite directions to engage their brake bands 121 with the brake wheels 120. The energization of the magnet 126 of a unit takes place simultaneously with the deenergization of the high speed clutch solenoid 116—FD or 116—RW of the unit, in a manner which will be explained in connection with the circuits. Thus, when the high speed rewind or forward find drive for a tape of a unit is disconnected, the brake means of this unit comes into action to prevent overrunning of the tape.

*The preliminary selecting means.*—This comprises the means whereby the operator may preliminarily choose record forms or paragraphs to be selected, read out, and typed. A maximum of six paragraphs, three from each of the two tapes T—*a* and T—*b* may be selected. The selecting means comprises a plugboard S (Figs. 1, 2, and 10) mounted on desk 1 and having six vertical divisions designated, at the bottom, "selector 1," "selector 2," . . . "selector 6." Selectors 1, 3, and 5 are capable of choosing three paragraphs from tape T—*a* only, and selectors 2, 4, and 6 may choose three paragraphs from tape T—*b* only. Each selector has four columns of plug sockets 130L, 130c, 130c′ and 130R, a left hand column of paragraph designating numbers 1 to 18 which identify sockets 130L and a right hand column of numbers 19 to 36 identifying sockets 130R. At the bottom of each selector is a row of three sockets 131. A three-wire plug connection 132 is used to connect the three sockets 131 of a selector to a socket 130L and the sockets 130c and 130c′ of the same row, or alternatively to a socket 130R and sockets 130c and 130c′. Thus, to select paragraph "4" of selector 1, the plug connection 132 is plugged into the socket 130L—4, adjacent figure "4," and to the two sockets 130c and 130c′ of the same row. To select paragraph "22," the plug connection 132 is made to the socket 130R—22, adjacent figure "22," and to the same two sockets 130c and 130c′.

Each of the selectors has, at the bottom, a row of three sockets 133 designated "zero." If selection by any of selectors 2 to 5 is to be skipped, the three sockets 133 of the selector are plugged by connection 132 to the sockets 131 thereof. A selection by selector 1 is always desired in the present case and, hence, its zero sockets 133 are merely dummy sockets.

Between one selector and the next is a pair of sockets 134 designated "insert" and which may be connected together by a plug wire to cause the robot to stop operating after the paragraph selected by the first of the two selectors has been automatically typed. This permits the operator to operate the typewriter manually for inserting desired matter between two automatically selected and typed paragraphs. The "insert" sockets may also be utilized to stop the machine to permit the attendant to eject the sheet in the typewriter and to insert a new sheet. This enables a single setting of the selectors to be made in advance for three two-paragraph letters or two three-paragraph letters, or one four-paragraph letter and one two-paragraph letter, or for other variations. For convenience, the insert sockets between two selectors may be differentiated as follows: between selectors 1 and 2 as 134 (1—2), between selectors 2 and 3 as 134 (2—3), between selectors 3 and 4 as 134 (3—4), and so on.

At the bottom of selector 6 are auto find sockets comprising two vertically spaced sockets 135(A) and two sockets 135(B). When the sockets 135(A) are connected by a plug wire, the robot, after reading out the last paragraph chosen by the advance setting of the plugboard, again automatically seeks and finds the first paragraph, chosen by selector 1, from tape T—a. If the sockets 135(B) are connected by a plug wire, the robot automatically finds the paragraph chosen by selector 2 from tape T—b. If a plug connection is made between sockets 135(A) and also a plug connection between sockets 135(B) then the paragraphs chosen by selectors 1 and 2 are automatically found after the typing of the last paragraph chosen by the setting of the plugboard.

Figure 1:
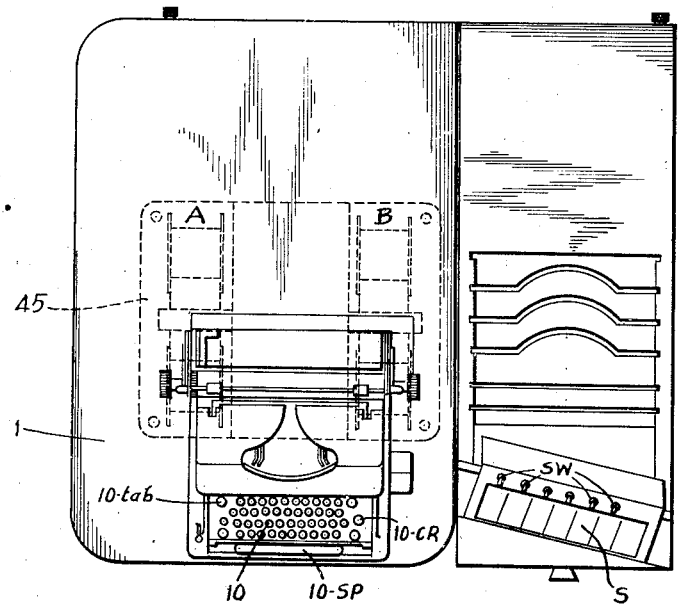
Fig. 1 is a plan view of the machine.
Figure 2:
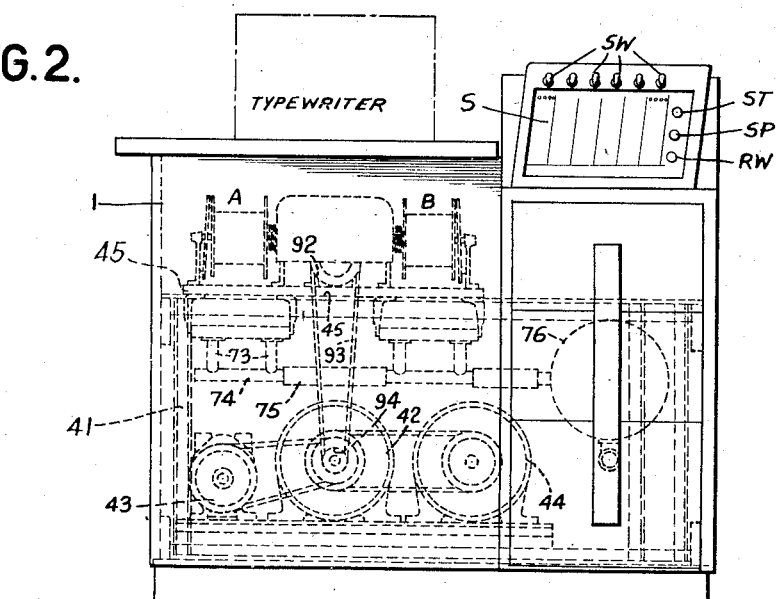
Fig. 2 is a front view of the machine.

As shown in Figs. 1 and 2, six toggle switches SW—1, 2, 3, 4, 5, and 6 are provided on the plugboard, each switch located above and related to one of the six selectors. When a switch SW is in open position, the paragraph chosen by the related selector is found by movement of the tape in a normal direction. When the toggle switch is in closed position, the chosen paragraph is found by movement of the tape in the rewind direction. For example, assume that selectors 1 and 3 are set to choose paragraphs "10" and "8" in succession from tape T—a. With switch SW—3 open, after paragraph "10" of tape T—a has been read out, the tape T—a is moved at finding speed in the normal direction and, since paragraph "8" is behind paragraph "10," the normal directional movement of tape T—a continues until after the last paragraph sections of the tape ("18" of the left deck and "36" of the right deck) leave the front spool, whereupon paper contacts 64—f open and cause the tape movement to be reversed and the tape to be fed in a rewind direction at finding speed until paragraph "8" identification is found. The paragraph sections of the left deck which are traversed during this procedure are "11" through "18" in the normal direction and "18" through the data portion of paragraph "8" in the rewind direction or a total of nineteen paragraph sections. If the toggle switch SW—3 had been set in closed position, then, after paragraph "10" of tape T—a had been read out, the tape would have been moved in a rewind direction through only paragraphs "10" and "9" and the data portion of paragraph "8" before paragraph "8" identification would have been found, or through a total of three paragraphs, sixteen less than with switch SW—3 in open position. The location of the paragraphs on the two decks of a tape with respect to one another is substantially indicated by the arrangement of the paragraph designating numbers in the columns of figures in a selector division. Thus, the operator, by reference to the columns of paragraph designating numbers, may determine whether the desired paragraph of a selector division is closer in a normal or in a rewind direction from the preceding chosen paragraph of the same tape, and may set the switch SW of the selector division accordingly. The selection of paragraphs through the shortest possible distance of travel of the tape saves time in the paragraph searching and finding operations, thereby providing for more rapid operation of the machine as a whole.

As shown in Fig. 2, the plugboard also mounts the start button ST, the stop button SP, and the rewind button RW.

The operation of the machine will be explained further in connection with the following description of the circuits.

Circuits and operation

Figs. 15a to 15e represent the wiring diagram of the machine. The current line L (see top of Fig. 15a) is suitably connected to a source of current supply. Through a standard overload release box 140, line L continuously energizes motor 42 (also see Fig. 2). Line L also has a connection 141 for the plug 142 of the typewriter to energize the typewriter motor upon closure of the typewriter switch 143. Assuming that the current source is not 110 D. C., the generator 44 (also see Fig. 2) is drivingly connected to the motor and furnishes 110 volts D. C. to the left and right current sides $Lt$ and $Rt$ of the robot. If a 110 volts D. C. supply is available, the generator is not required and current is fed to the opposite sides $Lt$ and $Rt$ through leads 144 and 145 connected to the outlet side of the overload release box 140.

The following system of notation is used in the circuits for convenience:

Each relay coil primarily relating to unit A is denoted by a number prefixed by letter A, each relay coil primarily relating to unit B is denoted by a number prefixed by letter B, each plural coil relay magnet primarily relating to unit A is denoted by a number prefixed by letters AM, each plural coil magnet of unit B is denoted by a number prefixed by letters BM, each plural coil magnet commonly related to both units is denoted by a number prefixed merely by letter M, and each relay coil common to both units is denoted by a number prefixed merely by letter R. Each duo-wound relay magnet, which includes a pick-up coil and a holding coil, is denoted, as a whole, by a number with a prefixed letter or letters indicating its relation to one or both of the units, as A—22, while the pick-up coil thereof is denoted by the letter P following the number, as A—22P, and the holding coil by adding the letter H, as A—22H. The relay contacts of the various relays are denoted by small letters or by digits related to the reference designation of the relay coil or magnet. Further, any means or circuit particularly relating to unit A may be distinguished by use of the letter A in parentheses, while any means or circuit relating to unit B may be distinguished by the use of the letter B in parentheses.

Assuming that the locations of the record forms of the tapes T—a and T—b with respect to the sensing stations of units A and B are initially unknown, the operator, in order to bring the tapes to known starting positions, with their first record forms "1" and "19" in front of the sensing stations, initially depresses the rewind key RW, establishing the following circuit (Fig. 15a):

*Rewind key circuit.*—Current side RT, normally closed start relay contacts R—25a, wire 146, rewind key contacts RW', in parallel through pick-up coil A—27P and pick-up coil B—27P, to current side Lt.

Coil R—27P closes contacts R—27a to close the following circuit:

*Rewind coil A—27H circuit.*—Side Lt, coil A—27H, contacts A—27a, normally closed stop relay contacts R—26a, wire 147, the normally closed side of start read relay contacts A—54a, the normally closed rear spool paper contacts 65—r(A), side Rt.

At the same time, coil B—27P closes contacts B—27a to form the following circuit:

*Rewind coil B—27H.*—Side Lt, coil B—27H, contacts B—27a, normally closed stop key relay contacts R—26b, the normally closed side of start read contacts B—54a, the normally closed rear spool contacts 65—r(B), to side Rt.

Coil A—27H closes the upper side of transfer contacts A—27b to form the following circuit (Fig. 15a):

(A) *Rewind clutch circuit.*—Side Lt, brake release relay coil A—31, solenoid 116—RW(A), the upper side of contacts A—27b, normally closed start relay contacts R—25a, side Rt.

The brake magnet 126 of each unit when energized engages the brake arms 121 with the brake wheels 120 of the unit to restrain movement of the driven parts of the unit (see Fig. 7). When current is placed on the opposite sides Lt and Rt of the line, the brake magnets are immediately energized. Referring to the middle of Fig. 15b, the circuit of brake magnet 126(A) extends through normally closed contacts A—31a, while the circuit of magnet 126(B) extends through normally closed contacts B—31a.

The (A) Rewind clutch circuit, incidentally to energization of clutch solenoid 116—RW(A), also energizes relay coil A—31 which opens contacts A—31a to break the circuit of brake magnet 126(A), resulting in release of the brake arms 121 from the driven mechanism of unit A.

The energization of solenoid 116—RW(A) results in actuation of the front spool of the A unit at high speed to rewind the tape T—a. When the record bearing length of this tape is exhausted from the rear spool, the associated switch 65—r(A) opens, breaking Rewind coil A—27H circuit. Consequently, the upper side of contacts A—27b opens to break the (A) Rewind clutch circuit, with the result that the rewinding of the tape ceases and the coil A—31 is deenergized to open contacts A—31a to restore the brake means to active braking condition to prevent overrunning of the tape in the rewinding direction.

Simultaneously with the formation of the (A) Rewind clutch circuit, the (B) Rewind clutch circuit is established, as follows, by the closing of the upper side of contacts B—27b (see top of Fig. 15b):

(B) *Rewind clutch circuit.*—Side Lt, coil B—31, clutch solenoid 116—RW(B), upper side of contacts B—27b, wire 148 (continue with Fig. 15a), start relay contacts R—25a, side Rt.

Coil B—31 opens contacts B—31a (Fig. 15b) to open the circuit of brake magnet 126(B). Solenoid 116—RW(B) causes rewinding of the tape T—b. The opening of rear switch 65—r(B) stops rewinding operation.

After tapes T—a and T—b have been rewound, the operator sets up the preliminary selector S (Figs. 1, 2, and 10) according to the series of record forms to be transcribed.

Assume first that it is desired to type on each sheet the matter designated on a series of six of the record forms, three from each tape. As an example, suppose that it is desired to type a letter with the data taken in succession from record "4" of tape T—a, record "19" of tape T—b, record "9" of tape T—a, record "29" of tape T—b, record "26" of tape T—a, and record "35" of tape T—b. Accordingly, referring to Fig. 10, the plug connections 132 from sockets 131 are made to row "4" sockets 130L, 130—c, and 130—c' of selector 1, to row "19" sockets 130R, 130—c, and 130—c' of selector 2, to row "9" sockets 130L, 130—c, and 130—c' of selector 3, to row "29" sockets 130R and 130—c and c' of selector 4, to row "26" sockets 130R and 130—c and c' of selector 5, and to row "35" sockets 130R and 130—c and c' of selector 6.

The second chosen paragraph "29" of tape T—b follows the first paragraph "19" and the third paragraph "35" follows the second paragraph. Accordingly, switches SW—2, 4, and 6 are set in open position to cause the chosen paragraphs of tape T—b to be found by movement of the tape in a normal direction. The second paragraph "9" of tape T—a follows the first paragraph "4" and switch SW—3 is also set in open position, but the third paragraph "26" of tape T—a is in a location leading the location of the second paragraph "9" and the shortest travel of the tape to bring paragraph "26" to the sensing station, after paragraph "9" has been read out, is in a rewind direction. Accordingly, switch SW—5 is set in closed, rewind finding position. Assume, also, that the auto find sockets 135 (Fig. 10) are not plugged.

The record forms of the left deck of a tape traverse the left track T—L (Fig. 3), while the right deck traverses the right track T—R. If a chosen record form is in the left deck, then the left deck analyzing means, including the left track T—L and associated contacts 82L (Figs. 5 and 6), should be effective to find the chosen form and to read out its designations. If a chosen record form is in the right deck, then the right deck analyzing means, including the right hand track and contacts 82R (Fig. 5), should be effective. As indicated in Figs. 15c and 15d, the contacts 82L of unit A are in series with the upper, normally closed sides of contacts 1 to 10 of a plural coil relay magnet AM—6, while the contacts 82R of unit A are in series with the lower, normally open sides of these contacts 1 to 10. As shown in Figs. 15d and e, the contacts 82L of unit B are in series with the normally closed sides of contacts 1 to 10 of a magnet BM—6 and the contacts 82R of unit B are in series with the normally open sides of these contacts 1 to 10. Thus, the condition of contacts 1 to 10 of AM—6 determines whether contacts 82L or 82R of unit A are to be connected into the circuit, and the condition of contacts 1 to 10 of BM—6 determines whether the contacts 82L or 82R of unit B are to be connected in the circuit. When contacts 82L are in the circuit, the left deck analyzing means is operative, and when contacts 82R are in the circuit, the right deck analyzing means is effective. The magnets AM—6 and BM—6 may be considered, respectively, as the track selecting magnets of units A and B. When a track selecting magnet is not energized, its contacts 1 to 10 are in normal position, rendering the left track of the related unit operative, and when the magnet is energized, its contacts 1 to 10 are in alternate position, rendering the right track of the related unit operative. The determination of whether a track selecting magnet is to be energized depends on whether a left deck record form or a right deck record form has been chosen. When a left deck record form has been chosen, the track selecting magnet remains deenergized, and when a right deck form has been chosen, the magnet is energized. In the assumed example, selectors 1 and 3 have been plugged to choose forms 4 and 9 of the left deck of the tape T—a, while the remaining selectors have been plugged to choose right deck record forms. Accordingly, when the robot is under control of selectors 1 and 3, the magnet AM—6 is deenergized to permit the left deck analyzing means to search the left deck of tape T—a for forms "4" and "9" and to read out their designations. When the robot is acting under control of the remaining selectors, then the track selecting magnet is energized to render the right deck analyzing means operative.

The first two record forms to be selected by the robot are the forms "4" of tape T—a and "19" of tape T—b, respectively chosen by selectors 1 and 2. The plugging of selector 1 for form "4" is, through plug connections 132 (Figs. 10 and 15c), from sockets 131 to sockets 130L, 130c, and 130c' of the "4" row. There is no connection between any of sockets 130L and the track selecting magnet, so that for the selector 1 control of the robot, the magnet AM—6 remains deenergized. The plugging of selector "2" is for form "19" and includes a plug wire 132 connection from a socket 131 to socket 130R—19 (Fig. 15d). The sockets 130R are connected to the track selecting magnet. Accordingly, in the assumed example, magnet BM—6 is energized through the following circuit (Fig. 15d):

*BM—6 circuit.*—Side Lt, magnet BM—6, the commonly connected sockets 130R of selector 2, the plug wire 132 from socket 130R—19 to a socket 131 of selector 2, the jumper to another socket 131, a wire 150, the normally closed sides of serially connected relay contacts B—40a and B—44a, side Rt.

BM—6 now shifts its contacts 1 to 10 to alternate position, rendering the right deck analyzing means of unit B operative. This is the first result of the plugging of form selecting means S for the assumed example.

After the selecting means has been set up, the operator depresses the start key ST, closing contacts ST' to form the following circuit (Fig. 15a):

*Start key circuit.*—Side Rt, normally closed stop relay contacts R—26c, normally closed contacts B—27c and A—27c, start key contacts ST', relay coil R—24, side Lt.

Coil R—24 closes contacts R—24a to form the following circuit:

*Start relay circuit.*—Side Lt, through parallel start relay coils R—57 and R—25, contacts R—24a, stop relay contacts R—26c, side Rt.

Coil R—25 closes contacts R—25b to shunt the contacts R—24a which open when the operator releases the start key. The Start relay circuit now remains closed until the stop key SP is operated to cause contacts R—26c to open. Depression of the stop key closes contacts SP' for energizing stop relay coil R—26. The coil R—26, when energized, opens contacts R—26c.

It may be noted that energization of stop relay coil R—26 also opens contacts R—26a and b, respectively in the Rewind coil A—27H and the Rewind coil B—27H circuits, to interrupt manually initiated rewinding of tape T—a or T—b at any desired moment. Further, with the manually initiated rewinding operation taking place, one or both of coils A—27H and B—27H are energized and holding one or both of their c contacts open to prevent formation of the Start key circuit. When the Start relay circuit has been established, contacts R—25a are held open by start relay coil R—25 to prevent manually initiated rewind operation. In order to permit manually initiated rewinding operation to occur, a previously established Start key circuit first must be broken by depression of the stop key.

Start relay coil R—57 closes contacts R—57a to establish the following circuit (Fig. 15a):

(A) *Find clutch circuit.*—Side Lt, brake release coil A—31, find clutch solenoid 116—FD(A), the normally closed side of relay contacts A—29a, contacts R—57a, normally closed relay contacts A—47a, the upper closed side of relay contacts A—22a, side Rt.

Energization of coil A—31 releases the brake means from the driven parts of unit A, in the manner explained before.

Energization of solenoid 116—FD(A) causes high speed movement of the tape T—a in the normal direction.

The tape T—b is simultaneously set moving at high speed in the normal direction as a result of the closing of start relay contacts R—57b to establish the following circuit (Fig. 15b):

(B) *Find clutch circuit.*—Side Lt, brake release relay coil B—31, find clutch solenoid 116—FD(B), the normally closed side of relay contacts B—29a, contacts R—57b, the closed side of relay contacts B—22a, normally closed relay contacts B—51a and B—47a, side Rt.

The two tapes T—a and T—b are now moving at finding speed in the normal direction. The first chosen record form of tape T—a is "4" and the first of tape T—b is "19". Record form "4" is the fourth form of the left record deck of a tape while record form "19" is the first form of the right record deck of a tape. Thus, with the two tapes starting from rewound position, the form "19" of tape T—b reaches the sensing station of unit B before the form "4" of tape T—a reaches the unit A sensing station.

The codal indication for paragraph "19" consists of perforations in index positions 6 and 7 of the right deck (see Fig. 13). When this indication in tape T—b travels over the right track T—R of unit B, sensing holes 6 and 7 thereof are uncovered, causing the connected pneumatics to close contacts 82R—6 and 82R—7 of unit B. As a result, the following circuit forms start with Fig. 15d):

(B) *Selector 2 record selecting circuit.*—Side

L*t*, pick-up coil B—22P, a socket 131 of selector 2, plug wire 132 to a socket 130c' of the "1"-"19" row of selector 2, a wire 151, the serially connected, normally closed sides of BM—1d, BM—2d, and BM—3d contacts, the now-closed lower side of the "7" contacts of BM—6, a wire 152 (continue with Fig. 15e), the now-closed analyzing contacts 82R—7 of unit B, the now-closed analyzing contacts 82R—6 of unit B, wire 153 (return to Fig. 15d), the now-closed lower side of the "6" contacts of BM—6, through the serially connected, normally closed sides of the BM—3c, BM—2c, and BM—1c contacts, a wire 154, a group of common sockets 130c in which the socket 130c of row "1"-"19" is included, a plug wire 132, a socket 131, wire 150, the normally closed contacts B—40a and B—44a, side R*t*.

The above circuit energizes pick-up coil B—22P to close contacts B—22b, establishing the circuit for holding coil B—22H, as follows (Fig. 15b):

Coil B—22H.—Side L*t*, coil B—22H, contacts B—22b, closed contacts B—14a, wire 155, closed contacts B—27b, side R*t*.

Coil B—22H opens the normally closed side of contacts B—22a in the (B) Find clutch circuit (Fig. 15b), deenergizing coil B—31 and clutch solenoid 116—FD(B). Consequently, the finding feed of tape T—b in the normal direction stops and the brakes are applied to the driven means of unit B. Tape T—b is now at rest, with form designation "19" at the sensing station and the remainder of form "19" in front of the sensing station. The first form of tape T—b is not read out until after the first chosen form of tape T—a is read out.

While unit B was hunting for paragraph "19" of tape T—b, unit A has been seeking paragraph "4" of tape T—a. Since paragraph "19" is closest to the analyzing station, it is found before paragraph "4". Tape T—b now remains at rest until paragraph "4" of tape T—a is found and read out.

Paragraph "4" is designated by perforations in positions 10 and 6 of the left deck, (Fig. 13). When the paragraph "4" designation of tape T—a reaches the sensing station of unit A, the pneumatic analyzing means of the left track closes contacts 82L—6 and 82L—10, causing the following circuit to form (Fig. 15c):

(A) Selector 1 record selecting circuit.—Side L*t*, coil A—22P, a socket 131 of selector 1, a plug wire 132, socket 130c of row "4"-"22", a wire 156, the normally closed sides of contacts AM—1c, AM—2c, AM—3c, the normally closed side of the "6" contacts of AM—6, contacts 82L—6, contacts 82L—10, the normally closed side of the "10" contacts of AM—6, the closed sides of contacts AM—3g, AM—2g, AM—1g, a wire 159, socket 130c' of row "4"-"19", a plug wire 132, a socket 131, a wire 158, the closed sides of contacts A—40a, A—44a, side R*t*.

Coil A—22P closes contacts A—22b (Fig. 15b), forming the following circuit:

Coil A—22H circuit.—Side L*t*, coil A—22H, contacts A—22b, contacts A—14a, wire 155, contacts B—27b, side R*t*.

Magnet A—22 opens the closed side of contacts A—22a of the (A) Find clutch circuit, causing finding movement of the tape T—a to stop and the brake means to be reapplied to the driven means of unit A. Tape T—a now is at rest with paragraph symbol "4" at the sensing station.

*Reading out of first tape T—a paragraph*

Coil A—22 has now closed the normally open, lower side of contacts A—22a, thereby establishing the following circuit (Fig. 15a):

(A) Read clutch circuit.—Side R*t*, the lower side of contacts A—22a, the normally closed side of contacts A—48a, the normally closed side of contacts M—5a, terminal 157, start relay contacts R—57c (now closed), the series of contacts R—16a, R—18a, R—19a, the normally closed side of front spool contacts 65—f' of unit A, read clutch solenoid 116—RD(A), brake release relay coil A—31, side L*t*.

Energization of coil A—31 releases the brake means, and energization of clutch solenoid 116—RD(A) sets tape T—a moving at reading speed in the normal direction.

Simultaneously with the above circuit, a branch circuit is formed with proceeds from terminal 157 through plural coil magnet AM—3. Energization of this magnet opens the normally closed sides of contacts AM—3a to g (Fig. 15c) and, consequently, the (A) Selector 1 record selecting circuit is broken. The closing of the lower sides of contacts AM—3a to g prepares for control translating coils R—4 to 10 (Fig. 15d) by valve contacts 82—4 to 10 of unit A. These coils correspond to intrazone index points "4" to "10" of which at least one is in each non-identifying designation shown in Fig. 14. The reading out and transcribing of a non-identifying designation requires the energization of the translating coil or coils corresponding to the intrazone points of the designation, as will be brought out more fully later. During the hunting by unit A of a chosen form of tape T—a, non-identifying designations are crossing the sensing station, but with the lower sides of contacts AM—3a to g open, none of the intrazone translating coils R—4 to 10 can be energized, and sensing of the latter designations, therefore, does not result in their being read out. When the chosen paragraph is found, magnet AM—3 is energized and the lower sides of contacts AM—3a to g close to enable the translation of the non-identifying designations of the chosen form to take place.

Magnet AM—3 also closes contacts AM—3h (lower right of Fig. 15c) to connect the common side 161 of the valve contacts 82 of unit A directly to the current side R*t*, thereby conditioning each of these contacts individually, when closed for completing a translating circuit. The translating means may be considered as including the analyzing means, the translating coils R—1, 2, 3, and 3', 4 . . . 10 (Fig. 15d), corresponding to index positions 1 to 10, and the translating circuits controlled by the coils and including the key solenoids 30 (see Figs. 11 and 15e). When a perforation in an index position is found by the analyzing means, the corresponding translating coil is energized. For perforation "3", both coils R—3 and 3' are energized by the same circuit. The translating coils are common to the analyzing means of units A and B. The condition of contacts 1 to 10 of a magnet M—5 (see Fig. 15d) determines whether the analyzing means of unit A or unit B is to control the translating coils. During reading out of the first form, the magnet M—5 is deenergized and its points 1 to 10 are in normal condition, connecting the translating coils to unit A analyzing means. The magnet AM—6 is also deenergized at this time, and its 1 to 10 contacts (Fig. 15c) are in normal condition to place the left deck analyzing contacts 82L of the unit A in control.

Tape T—a now is moving at reading speed and after form identifying symbol "4" passes the left track, the start read symbol (the first of each form after the identifying symbol) reaches the left track of unit A. The start read symbol includes perforations in index positions 2, 3, and 10 (Fig. 13) and sensing thereof causes contacts 82L—2, 3, and 10 of unit A to close, energizing translating coils R—2, 3, 3', and 10. For example, the circuit of coil R—2 is as follows (Fig. 15d):

*Translating coil R—2 circuit (A)*.—Side Lt, coil R—2, the normally closed side of the "2" contacts of M—5, line 160—2 (turn to Fig. 15d), the normally closed side of the "2" contacts of magnet AM—6, contacts 82L—2 (A), common wire 161, contacts AM—3h, side Rt.

Similar circuits are formed through coils R—3, 3', and 10. Coils R—2, 3, 3', and R—10 shift their armature contacts and the following circuit is established (Fig. 15e):

*Start read (A) circuit*.—Side Lt, contacts R—10a, in parallel through pick up coil R—17P and through the normally closed side of contacts M—5b and coil A—54, the 2—3 zone line, the upper side of contacts R—3a, the upper side of contacts R—2a, contacts R—1a, side Rt.

Coil R—17P closes contacts R—17a to form the following circuit (Fig. 15a, middle):

*Coil R—17H circuit*.—Side Lt, coil R—17H, contacts R—17a, normally closed contacts A—14b, B—14b, and A—27d, to side Rt.

Magnet R—17 closes contacts R—17b to prepare single intrazone point designation circuits to be formed through the "blank zone" line (Fig. 15e) for causing typing of the single intrazone characters 3 to 9 (Fig. 14) should their designations be sensed.

Coil A—54, energized by the Start read circuit (A), closes contacts A—54b to form the following circuit (Fig. 15b):

*Coil A—33P circuit*.—Side Lt, coil A—33P, contacts A—54b, side Rt.

Coil A—33P closes contacts A—33a to form the following circuit:

*Coil A—33H circuit*.—Side Lt, coil A—33H, contacts A—33a, contacts A—48b, B—27b, side Rt.

Coil A—33P circuit opens when the start read designation has passed the sensing station, but coil R—33H is not denergized until after the last selected record form of tape T—a has been read out.

After the start read symbol of record form "4" of tape T—a passes the left track T—L of unit A, the successive designations representing the body of data to be typed successively traverse the left track. These designations are successively analyzed and translated and the key solenoids corresponding to the designations operated. Several typical examples of the circuits for translating different designations are given below. The carriage return designation is 2—3—6 (Fig. 14) and the sensing thereof closes contacts 82L—2, 3, and 6 of unit A causing translating circuits to form through translating coils R—2, R—3, and 3', and R—6. The Translating coil R—2 circuit already has been traced, and the other translating coils are energized by similar circuits. Coils R—2, 3, 3', and 6 shift their armature contacts, and the following translating circuit forms (Fig. 15e):

*Carriage return solenoid 30—CR*.—Side Lt, contacts R—6a, the lower side of contacts R—21a, solenoid 30—CR, the lower side of contacts R—21b, the 2—3 zone line, the upper sides of contacts R—3a and R—2a, contacts R—1a, side Rt.

The carriage return solenoid 30—CR depresses the carriage return key to effect line spacing and carriage return operation of the typewriter (Fig. 11).

The upper case shift designation is 1—2—3—4 (Fig. 14) and its sensing closes contacts 82L—1, 2, 3 and 4 of unit A, in turn causing translating coils R—1, 2, 3, 3', and 4 to be energized for shifting their contacts to close the following translating circuit (Fig. 15e):

*Shift relay coil R—12P*.—Side Lt, contacts R—4a, coil R—12P, the lower side of contacts R—3'a, the upper side of contacts R—2b, contacts R—1b, side Rt.

Pick up coil R—12P closes contacts R—12a to complete the following circuit (middle of Fig. 15b):

*Shift circuit*.—Side Lt, in parallel through solenoid 30—SH and holding coil R—12H, contacts R—12a, contacts R—13a, side Rt.

Coils R—12H contains contacts R—12a closed and the Shift circuit remains in effect until contacts R—13a open as a result of a shift return circuit. Solenoid 30—SH holds the upper case shift key down to cause upper case typing until the shift return key is operated.

The shift return designation is 2—3—5 and the sensing thereof energizes translating coils R—2, R—3 and 3', and R—5, causing the following circuit (Fig. 15e) to form:

*Shift return relay coil R—13P*.—Side Lt, contacts R—5a, pick up coil R—13P, the zone 2—3 line, and from there, as in the start read and the carriage return circuits, to side Rt.

Coil R—13P closes contacts R—13b to complete a circuit, as follows (Fig. 15b):

*Coil R—13H*.—Side Lt, coil R—13H, contacts R—13b, contacts R—12b, side Rt.

Coil R—13H opens contacts R—13a, breaking the circuit of coil R—12H and shift solenoid 30—SH. As coil R—12H is deenergized, its b points open, breaking the coil R—13H circuit. Deenergization of solenoid 30—SH permits return of the typing means to lower case condition.

As an illustration of the translation of one of the 3 to 9 designations (which may be considered as blank zone designations), the "3" designation will be considered. The symbol for "3" is a single hole in the "4" index position (Fig. 14) and the sensing thereof closes contacts 82L—4 to effect energization of translating coil R—4, resulting in the closing of the following circuit (Fig. 15e):

*Solenoid 30—3*.—Side Lt, contacts R—4b, solenoid 30—3, relay contacts R—17b, the lower sides of contacts R—3b and R—2a, contacts R—1a, side Rt.

Solenoid 30—3 operates key 10—3 to cause typing of the digit "3".

As an illustration of the translation of an alphabetic character designation, consider the "e" designation, represented by perforations in index positions "1" and "8". The sensing of the "e" symbol results in energization of coils R—1 and R—8, and the following circuit (Fig. 15e) forms:

*Solenoid 30—e*.—Side Lt, contacts R—8a (right side of Fig. 15e), solenoid 30—e, the 1 zone line, the lower sides of contacts R—3'b and R—2b, contacts R—1b, side Rt.

The last designation of each record form is a paragraph end designation 2—3—8, the sensing of which energizes coils R—2, 3 and 3', and 8. When this happens during reading out of a form of tape T—a, the following circuit (Fig. 15e) is completed:

*Paragraph end (A) circuit.*—Side Lt, contacts R—8b, the upper side of contacts M—5c, paragraph end relay coil A—14, the 2—3 zone line, and then, as in the other 2—3 zone circuits, to side Rt.

Coil A—14 opens contacts A—14a in the coil A—22H circuit (Fig. 15b), and, consequently, the upper side of contacts A—22a (lower right of Fig. 15a) of the (A) Find clutch circuit recloses while the lower side of contacts A—22a reopens to break the (A) Read clutch circuit and the branch circuit through magnet AM—3. Coil A—14 also opens contacts A—14b to break the holding circuit of coil R—17H (left center of Fig. 15a). Coil A—14 also closes contacts A—14c (bottom of Fig. 15b). It will be recalled that coil A—33P was energized by the translation of the start read designation of the first selected paragraph ("4") of tape T—a and that, as a result, the Coil A—33H Circuit (Fig. 15b) was formed and held. Consequently, contacts A—33b in series with contacts A—14c are still closed and when the latter contacts close, the following circuit forms (Fig. 15b):

*Coils A—39P and A—40P circuit.*—Side Rt, contacts A—14c, contacts A—33b, and, in parallel, through coils A—39P and A—40P, to side Lt.

Coils A—39P and A—40P, respectively, close contacts A—39a and A—40b to establish the following circuit (Fig. 15b):

*Coils A—39H and A—40H circuit.*—Side Lt, in parallel through coil A—39H and contacts A—39a and through coil A—40H and contacts A—40b, to wire 163, contacts A—48b and B—27b, side Rt.

Coil A—39H closes contacts A—39b, and since the upper side of contacts A—22a have reclosed, the following circuit forms (Fig. 15a):

*Magnet AM—1 circuit.*—Side Lt, magnet AM—1, contacts A—39b, the normally closed side of A—22a contacts, side Rt.

Coil A—39H also closes contacts A—39c to form the following circuit (Fig. 15b):

*Magnet M—5 circuit #1.*—Side Lt, magnet M—5, contacts A—39c, contacts B—39a, B—48a, side Rt.

Coil A—40H opens the upper side of A—40a contacts and closes the lower side (Fig. 15c), transferring the control of magnet AM—6 to selector 3, which, being plugged to "9", does not cause energization of AM—6 during the selection and readout of the second form of tape T—a.

At this time, as a result of the sensing of the paragraph end designation of the first selected record form of tape T—a, which occurred after the substance of the form had been read out, the (A) Read clutch circuit has been broken, magnet AM—3, is deenergized, the (A) Find clutch circuit is reestablished to feed tape T—a at finding speed until the form chosen by selector 3 (Fig. 10) is found, coil B—22H is energized as a result of the first chosen paragraph of tape T—b having been found, and magnets AM—1 and M—5 are energized. Magnet BM—6 is also still energized because of the preliminary selection of the right hand deck paragraph "19" (B) by selector 2. The latter paragraph has been found and is awaiting translation.

Magnet AM—3, being deenergized, permits the lower sides of contacts AM—3a to g to reopen, disconnecting the unit A contacts 82—4 to 10 from the translating coils to prevent reading out of non-identifying designations of the tape T—a while the second paragraph thereof, chosen by selector 3, is being hunted. The closing of the upper sides of contacts AM—3a to g prepares the selecting means to select this second paragraph of tape T—a during the finding movement of the tape which is now taking place. Contacts AM—3h also reopen to force the form selecting circuit to extend serially through a pair of contacts 82 of unit A.

Magnet AM—1, being energized, closes the lower sides of its a to g contacts to place the form selecting circuit for tape T—a under control of selector 3 in selecting the second chosen paragraph "9" of this tape.

Magnet M—5, now energized, closes the lower sides of its "1" to "10" contacts (Fig. 15d), connecting the translating coils to the unit B analyzing means. Contacts M—5a (bottom of Fig. 15a) open to prevent reestablishing of the (A) Read clutch circuit and of the circuit of magnet AM—3 when the lower side of contacts A—22a recloses as a result of the completion of the selection of the second chosen form of tape T—a. The reading of the latter form, when selected, requires completion of the read out of the first chosen form of tape T—b. Magnet M—5 also shifts its b contacts (Fig. 15e) to cause coil B—54 to be energized when the start read designation of a tape T—b form is sensed. Contacts M—5c are also shifted to cause energization of coil B—14 (Fig. 15e) when the paragraph end designation of a tape T—b form is sensed.

*Reading out of first tape T—b paragraph*

Magnet M—5 also closes contacts MCR—5d (upper right of Fig. 15b) to complete the (B) Read clutch circuit and a branch circuit through magnet BM—3, as follows:

*(B) Read clutch circuit.*—Side Rt, contacts B—41a, B—51a, the lower side of contacts B—22a, contacts B—47b, contact M—5d, start relay contacts R—57d, contacts R—16d, R—18b, R—19b, the normally closed upper side of front spool contacts 65—f' of unit B, solenoid 116—RD(B), brake release relay coil B—31, side Lt.

A branch circuit extends from contacts M—5d through magnet BM—3 to side Lt. In shunt with magnet BM—3 is a repeat interlock coil B—56, which is always energized when a tape T—b form is being read out.

Tape T—b now is fed at reading speed to have the designations of its selected form "19" read out. Magnet BM—3 closes the lower side of its a to g contacts (Fig. 15d) to condition the translating coils R—4 to 10 for control by the corresponding analyzing contacts 82—4 to 10 of unit B. Contacts BM—3h (bottom of Fig. 15d) are closed to connect the common side 165 of contacts 82 of unit B directly to side Rt.

Magnet BM—6 is now energized, and the lower sides of its points "1" to "10" are connecting the right deck analyzing contacts 82R (Fig. 15e) of unit B into the circuits of translating coils R—1 to 10 (Fig. 15d).

The first designation which is sensed is the start read designation, resulting in closing of contacts 82R—2, 3, and 10 of unit B, causing translating coils R—2, 3, 3', and 10 to be energized. For example, the circuit of coils R—3 and 3' is as follows (Fig. 15d):

*Translating coils R—3 and 3' circuit (B).*—Side Lt, coils R—3, R—3' the lower, now-closed side of the "3" contacts of magnet M—5, line 160—3, the lower, now-closed side of the "3" contacts of magnet BM—6, line 164 (continue with Fig. 15e), valve contacts 82R—3, common line 165 (return to Fig. 15d), contacts BM—3h (now closed), side Rt.

Similarly, circuits are formed through the other translating coils when the correspondingly numbered valve contacts 82R of unit B are closed.

The start read designation causes energization of coils R—2, 3, 3', and 10, and closure of their armature contacts forms a Start read (B) circuit, similar to the Start read (A) circuit, traced before, except that with the lower side of contacts M—5b now closed (Fig. 15e), the coil B—54, instead of A—54, is energized, along with coil R—17.

Coils B—54 closes contacts B—54b to form the following circuit (Fig. 15c):

*Coil B—33P circuit.*—Side Lt, coil B—33P, contacts B—54b, side Rt.

Coil B—33P closes contacts B—33a to establish the following circuit (Fig. 15c):

*Coil B—33H circuit.*—Side Lt, coil B—33H, contacts B—33a, wire 166, contacts B—48b, wire 180 (turn to Fig. 15b), contacts B—27b, side Rt.

Coil B—33H remains energized until the last selected form of tape T—b is read out.

After the start read designation of the first selected paragraph of tape T—b has been read out, the designations, representing a body of data, are successively read out and transcribed, in the same manner as explained before for the first selected form of tape T—a.

The final designation of the selected form of tape T—b is a paragraph end designation 2—3—8 (Fig. 14), causing energization of translating coils R—2, R—3 and 3', and R—8, as a result of which a Paragraph end (B) circuit is established which is like the Paragraph end (A) circuit traced previously, except that with the lower side of the c contacts (Fig. 15e) of magnet M—5 closed, the coil B—14, instead of A—14, is energized. Coil B—14 opens contacts B—14b (Fig. 15a) to break the coil R—17H circuit, causing contacts R—17b to open and disable the "blank zone" translating line (Fig. 15e). Coil B—14 also opens contacts B—14a in the Coil B—22H circuit (middle of Fig. 15b), and resulting deenergization of coil B—22h permits the lower side of contacts B—22a (top of Fig. 15b) to reopen and the upper side to reclose, thereby breaking the (B) Read clutch circuit and again making the (B) Find clutch circuit. The feed of tape T—b is now shifted from the read clutch drive to the find clutch drive and continues at finding speed in the normal direction until the second paragraph of this tape, chosen by selector 4 (Fig. 10), is found.

Coil B—14 also closes contacts B—14c (right of Fig. 15c). It will be recalled that the Coil B—33H circuit was closed as a result of the start read designation of the first selected paragraph of tape T—b, and, consequently, contacts B—33b, in series with contacts B—14c, are now closed, establishing the following circuit (Fig. 15c):

*Coils B—39P and B—40P.*—Side Rt, contacts B—14c, B—33b, in parallel through coils B—39P and B—40P, side Lt.

Coil B—39P closes contacts B—39b to form the circuit of holding coil B—39H as follows (Fig. 15c):

*Coil B—39H.*—Side Lt, coil B—39H, contacts B—39b, contacts B—48b, wire 180, contacts B—27b, side Rt.

A parallel circuit is formed through the coil B—40H as follows:

*Coil B—40H.*—Side Lt, coil B—40H, contacts B—40b, contacts B—48b, wire 180, contacts B—27b, side Rt.

Coil B—39 maintains contacts B—39a in the magnet M—5 Circuit #1 (Fig. 15b) open during the reading out of the second selected form of tape T—a. Resulting deenergization of magnet M—5 permits its "1" to "10" contacts (Fig. 15d) to return to normal conditions, connecting the translating coils R—1 to 10 to the unit A valve contacts 82. Contacts M—5d, in the (B) Read clutch circuit, open to prevent making of the latter circuit until after the second selected paragraph of tape T—a has been read out. The opening of contacts M—5d also breaks the circuit of magnet BM—3 and of coil B—56. Contacts M—5b (Fig. 15e) of the Start read circuits return to normal condition to cause the start read designation of the second selected paragraph of tape T—a to energize coil A—54. Contacts M—5c (Fig. 15e) of the Paragraph end relay circuits return to normal to cause the analysis of the end of paragraph designation of the second selected tape T—a paragraph to energize coil A—14. Contacts M—5a (bottom right of Fig. 15a) reclose to enable the (A) Read clutch circuit to be reestablished provided the second chosen paragraph of tape T—a (chosen by selector 3) has been found. Unit A started seeking the latter paragraph when transcribing of the first selected paragraph of tape T—a was completed and control of the transcribing means was transferred to the first selected paragraph of tape T—b as explained before. At the same time, coil A—40H was energized and shifted its contacts A—40a (Fig. 15c), and magnet AM—1 was energized due to closure of contacts A—39b and return to normal of contacts A—22a (Fig. 15a). Consequently, AM—1a to g contacts (Fig. 15c) were shifted to place the selection of the second chosen paragraph of tape T—a under control of selector 3, set to "9" for the assumed example. The hunt for this tape T—a paragraph proceeded during the read out and transcription of the first selected form of tape T—b and may have been completed before or after the transcription of the latter form was completed. The sensing of the form "9" identifying designation of tape T—a completes a selector 3 circuit, similar to the (A) Selector 1 record selecting circuit, traced before, except that the selector 3 circuit extends through the latter selector, the lower, now-closed side of the AM—1a to g contacts, and the lower, now-closed side of contacts A—40a. The selector 3 circuit again energizes coil A—22P which, in turn, causes energization of coil A—22H. The upper side of contacts A—22a (Fig. 15a, near bottom) opens, again breaking the (A) Find clutch circuit and also breaking the circuit of magnet AM—1. Further, the lower side of the A—22a contacts recloses, and when the M—5a contacts reclose as a result of the completion of the read out of the first selected paragraph of tape T—b, the (A) Read clutch circuit is reestablished, as is, also, the shunt circuit through AM—3.

Coil B—40H has been energized and has opened the upper side of contacts B—40a to break the BM—6 Circuit extending through selector 2 (see Fig. 15d), while the closing of the lower side of contacts B—40a shifts the circuit of magnet BM—6 to selector 4. Since selector 4 is set, in the assumed example, to paragraph "29", a right hand socket 130R thereof is plugged, causing magnet BM—6 to be energized during selection and read out of the second chosen paragraph of tape T—b.

Coil B—39H closed contacts B—39c to form the following circuit (Fig. 15b):

*Magnet BM—1.*—Side Lt, magnet BM—1, contacts B—39c, the upper side of the B—22a contacts, contacts B—51a, contacts B—47a, side Rt.

Magnet BM—1 shifts its a to g contacts (Fig. 15d) to place the selection of the second paragraph of tape T—b under control of selector 4. Thus, unit B, which is now feeding tape T—b at finding speed, will select the second paragraph of tape T—b under control of selector 4.

*Read out of second tape T—a paragraph*

At this point, magnets BM—1, AM—3, and BM—6 are energized; the read clutch solenoid of unit A is energized and selected tape T—a paragraph "9" is moving past the left sensing track T—L; the find clutch solenoid of unit B is energized; coils B—33H, A—39H, A—40H, B—39H, and B—40H are energized; and magnets BM—3, M—5, and AM—6 are deenergized.

After the paragraph designation of form "9" of tape T—a passes the sensing station, the start read designation is sensed, contacts 82L—2, 3, and 10 close, translating coils R—2, R—3 and 3′, and R—10 are energized, and the Start read (A) circuit, traced previously, is formed, energizing start read relay coil A—54. Contacts A—54a (Fig. 15b, near the bottom) thereupon close and, since coil A—39 is still energized, contacts A—39d are closed, with the result that the following circuit (Fig. 15b) forms:

*Coil A—35P circuit.*—Side Rt, contacts A—54b, and A—39d, coil A—35d, coil A—35p, side Lt.

Contacts A—35a close, forming the following holding circuit:

*Coil A—35H circuit.*—Side Lt, coil A—35H, contacts A—35a, wire 163, contacts A—48b, B—27b, side Rt.

Coil A—35H closes contacts A—35b (top of Fig. 15c) to prepare the circuit of a pair of coils A—43P and A—44P for subsequent closure when paragraph end relay coil A—14 is energized to close contacts A—14c (bottom of Fig. 15b) after reading out of the second selected paragraph of tape T—a, now starting, has been finished.

After the start read designation of tape T—a form "9" has been read out, the designations representing the body of data are successively read out to cause typing of the data, in the same manner as previously explained. When the "end of paragraph" designation of form "9" of tape T—a is read out, the Paragraph end (A) circuit again forms, energizing coil A—14. Thereupon, contacts A—14a (Fig. 15b) open, breaking the Coil A—22H circuit (Fig. 15b). Simultaneously, coil A—14 closes its contacts A—14d (Fig. 15a). Previously, the start read designation of the T—a form had caused coil A—54 to be energized, the contacts A—54a of which, in conjunction with the already closed contacts A—39d, had formed the Coil A—35P circuit which, in turn, caused the Coil A—35H circuit to be established. When coil A—14 is energized later under control of the paragraph end designation of the tape T—a paragraph, its contacts R—14d close. According to the assumed example, switch SW—5 has been set to rewind position. With contacts A—14d closed by coil A—14, the upper side of contacts A—35c closed by energized coil A—35H, and with switch SW—5 closed, the following circuit is established (Fig. 15a):

*Auto rewind coil A—29 circuit.*—Side Lt, coil A—29, switch SW—5, the upper side of contacts A—35c, the upper, normally closed side of A—37a contacts, contacts R—14d, side Rt.

Coil A—29 now closes contacts A—29b to form a holding circuit through these contacts, contacts A—54a, and the closed rear spool contacts 65—r(A). This holding circuit will be broken when the start read designation of the third selected form "26" of tape T—a is sensed to energize start read coil A—54, opening contacts A—54a.

Thus, as a result of the analysis of the paragraph end designation of the second chosen form of tape T—a; namely, form "9", coil A—22H has been deenergized and coil A—29 has been energized. The lower side of contacts A—22a reopens, breaking the (A) Read clutch circuit and the circuit of AM—3 magnet. The upper side of contacts A—22a recloses, normally prepared to make the (A) Find clutch circuit, but as coil A—29 is now energized, the lower side of contacts A—29a of the latter circuit are open, preventing the circuit from making. Instead, with the upper side of contacts A—29a closed, the following circuit forms (Fig. 15a):

*(A) Rewind record finding circuit.*—Side Lt, brake release relay coil A—31, rewind clutch solenoid 116—RW(A), the lower side of A—27b contacts, the upper side of contacts A—29a, start relay contacts R—51a, contacts A—47a, the upper side of contacts A—22a, side Rt.

Solenoid 116—RW(A) now moves tape T—a in the rewinding direction to enable unit A to find the third chosen paragraph thereof. This third paragraph is "26", chosen by plugging of selector 5. The second paragraph of tape T—a which has been read out is "9", and since paragraph "26" leads paragraph "9", the switch SW—5 was initially set by the operator in rewind position. Consequently, as explained above, the third chosen paragraph of tape T—a is now being sought by moving this tape in a rewind direction at high speed.

When the paragraph end coil A—14 was energized by the reading out of the paragraph end designation of the second selected form of tape T—a; namely, form "9", contacts A—14c were closed and with previously energized coil A—35H holding its contacts A—35b closed, the following circuit forms (start with the top of Fig. 15c):

*Coils A—43P and A—44P circuit.*—Side Lt, in parallel through coils A—43P and A—44P, contacts A—35b, wire 168 (continue with Fig. 15b), contacts A—14c, side Rt.

Coil A—43P closes contacts A—43a to form the holding circuit as follows (Fig. 15c):

*Coil A—43H.*—Side Lt, coil A—43H, contacts A—43a, wire 163 (continue with Fig. 15b), contacts A—48b, B—27b, side Rt.

Coil A—44P closes contacts A—44b to form a similar holding circuit through coil A—44H.

*Selection and read out of the second tape T—b paragraph*

Magnet A—43 closes contacts A—43b to form the second circuit of magnet M—5 (Fig. 15b), as follows:

*Magnet M—5 circuit #2.*—Side Lt, magnet M—5, contacts A—43b, B—43a, B—48a, side Rt.

During the reading out of paragraph "9" of tape T—a, unit B has been hunting for the second form of tape T—b chosen by selector 4. This second form of tape T—b is "29" and when its designation is sensed, a selector circuit is established which is like the (B) Selector 2 record selecting circuit, except that with magnet BM—1 and coil B—40H now energized, the selection is effected through selector 4 (Fig. 15d), the lower sides of the BM—1a to g contacts, and the lower side of contacts B—40a. When the selection under control of selector 4 has been made, magnet B—22 is energized and the upper side of contacts B—22a open to break the circuit of magnet BM—1 and the (B) Find clutch circuit. The closure of the lower side of contacts B—22a acts in conjunction with the closure of contacts M—5d to form the (B) Read clutch circuit. Contacts M—5d are closed when the read out of the selected form of tape T—a has been finished, and the lower side of contacts B—22a closes when the selection of a form of tape T—b has been completed. Either of these may occur first, but when both have occurred, then the (B) Read clutch circuit forms to feed tape T—b at reading speed. Incidentally to the making of the (B) Read clutch circuit, the shunt circuits through coil B—56 and magnet BM—3 also make, and the upper side of contacts BM—3a to g (Fig. 15d) open, breaking the paragraph selecting circuit, while the lower sides close to enable the translating coils R—4 to 10 to be energized upon analysis of data designations. With magnet M—5 also energized, the lower sides of its "1" to "10" contacts are closed to place all the translating coils under control of Unit B. With BM—6 magnet energized, its "1" to "10" points select the right hand deck analyzing contacts 82R of unit B for controlling the translating circuits. The closure of contacts BM—3h (bottom of Fig. 15d) enables the contacts 82R singly to control the corresponding translating coils.

Unit B then proceeds to read out the designations of the second selected form "29" of tape T—b. When the start read designation of this second selected paragraph of tape T—b is analyzed, the coil B—54 (Fig. 15e) is energized. It will be recalled that as a result of the reading out of the paragraph end designation of the first selected form of tape T—b, the Coil B—39H circuit (Fig. 15c) was established. When coil B—54 is energized by the start read designation of the second selected paragraph of tape T—b, now being read out, then its contacts B—54b close and with contacts B—39d now being held closed by energized coil B—39H, the following circuit forms (Fig. 15c):

Coil B—35P circuit.—Side Lt, coil B—35P, contacts B—39d, contacts B—54b, side Rt.

Contacts B—35a close, establishing a circuit, as follows (Figs. 15c and 15b):

Coil B—35H circuit.—Side Lt, coil B—35H, contacts B—35a, wire 166, contacts B—48b, wire 180, contacts B—27b, side Rt.

After the start read designation of the second selected form of tape T—b has passed the sensing station, the successive designations representing the body of data are read out and typed in the same manner as explained for the first selected form of this tape. When the end of paragraph designation of the second selected form of tape T—b is analyzed, coil B—14 (Fig. 15e) is energized. At this point, coil B—35H is energized, holding contacts B—35b closed and when contacts B—14c close, the following circuit forms (Fig. 15c):

Coil B—43P and B—44P circuit.—Side Lt, parallel coils B—43P and B—44P, contacts B—35b, B—14c, side Rt.

Coil B—43P closes B—43b contacts to form the following circuit (Figs. 15c and 15b):

Coil B—43H circuit.—Side Lt, coil B—43H, contacts B—43b, wire 166, contacts B—48b, wire 180, contacts B—27b, side Rt.

A parallel circuit through coil B—44H is formed upon closing of contacts B—44b by coil B—44P.

When paragraph end relay coil B—14 was energized, it opened contacts B—14a to break the circuit of coil B—22H (Fig. 15b), causing contacts B—22a to return to normal condition, and with coil B—43H holding contacts B—43c closed, the following circuit forms (top of Fig. 15b):

Magnet BM—2 circuit.—Side Lt, magnet BM—2, contacts B—43c, the upper side of contacts B—22a, contacts B—51a, B—41a, side Rt.

Energization of magnet BM—2 closes the lower sides of its a to g contacts (Fig. 15d), forcing the selection of the next (third) paragraph of tape T—b to be made through Selector 6.

Coil B—44 has opened the upper side of its contacts (middle of Fig. 15d) and closed the lower side. The opening of the upper side of contacts B—44a breaks the magnet BM—6 circuit formed through the right hand sockets of Selector 4, while the closing of the lower side of these contacts places the circuit of magnet BM—6 under control of the right hand sockets of Selector 6.

When the contacts B—22a returned to normal condition, the (B) Read clutch circuit broke, and the (B) Find clutch circuit was reestablished, so that tape T—b is now moving at finding speed to have its next paragraph selected under control of selector 6.

When the (B) Read clutch circuit was broken, the parallel circuit through magnet BM—3 was opened, and its h contacts (bottom of Fig. 15d) reopened. Also, the BM—3a to g contacts returned to normal condition to enable a selection circuit to be formed under control of selector 6.

*Selection and read out of third paragraph of tape T—a*

Coil B—43H, energized as a result of the completion of the reading out of the second paragraph of tape T—b, opens contacts B—43b of the Magnet M—5 circuit #2. Deenergization of this magnet causes its "1" to "10" contacts (Fig. 15d) to shift the control of translating coils R—1 to 10 to the unit A analyzing means. Contacts M—5a (bottom right of Fig. 15a) now reclose permitting the (A) Read clutch circuit to be reestablished, provided the lower side of contacts A—22a has closed. It will be remembered that while the second paragraph of tape T—b was being read out, the (A) Rewind record finding circuit was made and the third chosen paragraph of tape T—a was being sought under control of the selector 5 during rewind feed of the tape.

The coil A—44H circuit was established at the end of the read out of the second selected form of tape T—a. Consequently, contacts A—44a are now in shifted position, connecting the selector 5 to the right hand current side Rt. Selector 5 has chosen record body "26", involving the plugging of right hand socket 130R—26. Accordingly, the following circuit forms (Fig. 15c):

Magnet AM—6 circuit.—Side Lt, magnet AM—6, the common hubs of sockets 130R of selector 1, wire 169, the common hubs of sockets 140R of selector 5, socket 130R—26, the plug wire 132 to a socket 131, a wire 170, the lower side of contacts A—44a, side Rt.

Magnet AM—6 closes the lower sides of its "1" to "10" contacts to place the selection of chosen form "26" of tape T—a under control of the right deck analyzing contacts 82R of unit A.

At the same time as coil A—44 was energized, the coil A—43 was also energized and its contacts A—43c were closed. During the hunting for a paragraph of tape T—a, the contacts A—22a are in normal condition. Consequently, the following circuit forms (Fig. 15a):

Magnet AM—2 circuit.—Side Lt, magnet AM—2, contacts A—43c, the upper side of contacts A—22a, side Rt.

Magnet AM—2 closes the lower sides of its a to g contacts, placing the selection of the third paragraph of tape T—a under control of selector 5. When the right deck sensing means of unit A senses paragraph identification "26," the designation of which is 8—9, the valve contacts 82R—8 and 82R—9 are closed, and the following circuit forms (Fig. 15c):

(A) Selector 5 record selection.—Side Lt, coil A—22P, the central socket 131 of selector 5, the plug wire 132 to the socket 130c' in the "26" row, the jumper to wire 171, the lower side of contacts AM—2f, the upper side of contacts AM—3f, the lower side of the "9" contacts of AM—6, line 172 (turn to Fig. 15d), the contacts 82R—9 of unit A, the wire 161, contacts 82R—8, wire 173 (return to Fig. 15c), the lower side of the "8" contacts of AM—6, the upper side of contacts AM—3e, the lower side of contacts AM—2e, the wire 174, the socket 130c of row "26," the plug wire 132 to the lower socket 131, the jumper to the upper socket 131, wire 170, the lower, now-closed side of contacts A—44a, current side Rt.

As a result of the above circuit, coil A—22H is energized and contacts A—22a shifted. With the lower side of contacts A—22a closed and with the contacts M—5a closed as a result of completion of the read out of the second selected paragraph of tape T—b, the (A) Rewind record finding circuit is broken and the (A) Read clutch circuit reestablished.

When the (A) Read clutch circuit is made, the parallel circuit through magnet AM—3 also is completed and the upper sides of its a to g contacts open to break the paragraph selecting circuit of unit A, while the closing of the lower sides of these contacts brings the translating coils R—4 to 10 under control of the unit A valve contacts 82—4 to 10. Contacts AM—3h also close (bottom of Fig. 15c) to enable the contacts 82 individually to close translating coil circuits.

The AM—6 circuit still is made and its contacts "1" to "10" are in shifted condition, selecting the right hand valve contacts 82R of unit A to control the translating coils.

When the coil A—22H was energized, the upper side of its contacts A—22a opened, breaking the circuit of magnet AM—2 (Fig. 15a bottom).

At this time, the third selected record form of tape T—a is being read out, and the third chosen form of tape T—b is being sought under control of selector 6.

When the start read designation of the third selected form of tape T—a is analyzed and translated, coil A—54 is energized, its contacts A—54a open to break the holding circuit of rewind control coil A—29, and its contacts A—54b (lower portion of Fig. 15c) close. At this time, coil A—43H is energized, holding contacts A—43d closed and, consequently, the following circuit forms:

Coil A—37P circuit.—Side Lt, coil A—37P, contacts A—43d, A—54b, side Rt.

Coil A—37P closes the A—37b contacts to form the holding circuit, as follows:

Coil A—37H circuit.—Side Lt, coil A—21H, contacts A—37b, wire 163, contacts A—48a, B—27b, side Rt.

Coil A—37H shifts contacts A—37a (right center of Fig. 15a) to prevent the making of the circuit of auto rewind control coil A—29 through switch SW—5.

Coil A—37H also holds contacts A—37c (upper right of Fig. 15c) closed to prepare the pair of coils A—47P and A—48P for subsequent energization when the paragraph end designation of the tape T—a form, now being transcribed, is later read out.

The third selected form of tape T—a; namely, form "26" in the assumed example, is being read out. After its start read designation passes the sensing station, the data designations are transcribed. Following the data designations is the end of paragraph designation, causing paragraph end relay A—14 to be energized. Consequently, contacts A—14a open to break the A—22H circuit (Fig. 15b), permitting contacts A—22a (Fig. 15a) to return to normal condition. The opening of the lower side of contacts A—22a breaks the (A) Read clutch circuit and also the magnet AM—3 circuit.

When paragraph end relay coil A—14 is energized, contacts A—14c (bottom of Fig. 15b) close and since contacts A—37c are now closed by the still energized coil A—37H, the following circuit forms (start with Fig. 15c):

Coils A—47P and A—48P.—Side Lt, parallel coils A—47P and A—48P, contacts A—37c, line 168 (turn to Fig. 15b), contacts A—14c, side Rt.

Coil A—47P closes contacts A—47b and coil A—48P closes contacts A—48b to form parallel circuits through coils A—47H and A—48H, as follows:

Coils A—47H and A—48H.—Side Lt, in parallel through coil A—47H and contacts A—47b and through coil A—48H and contacts A—48b, to normally closed start key relay contacts R—24b, wire 180 (turn to Fig. 15b), contacts B—27b, side Rt.

Coil A—47H opens contacts A—47a, common to the (A) Find and rewind clutch circuits, so that although the upper side of contacts A—22a have reclosed, due to completion of the read out of the third selected form of tape T—a, neither the (A) Find or rewind clutch solenoid is energized, and tape T—a now remains at rest.

Coil A—48H opens contacts A—48a in the (A) Read clutch circuit to insure this circuit remaining open after the third selected paragraph of tape T—a has been read out and until the start key is again operated to initiate a repeat transcription of a series of chosen forms.

When coil A—48H was energized, it also opened contacts A—48b, (Fig. 15b) in the common side of coils A—33H, A—35H, A—37H, A—39H, A—40H (Fig. 15b), A—43H, and A—44H (Fig. 15c). Deenergization of these coils permits their contacts to return to initial condition.

Coil A—48H also closes contacts A—48c (Fig. 15b) to make the third circuit of magnet M—5 as follows:

Magnet M—5 circuit #3.—Side Lt, magnet M—5, contacts A—48c, B—48a, side Rt.

Selection and read out of third tape T—b paragraph

Energization of magnet M—5 places the translating means under control of unit B, in the manner explained before. While the third selected paragraph of tape T—a was being read out, the third chosen form of tape T—b was being sought under control of Selector 6, and when the latter form is found, coil B—22H is energized and contacts B—22a (top of Fig. 15b) shifted to actuated condition, breaking the (B) Find clutch circuit and the magnet BM—2 circuit, and preparing the (B) Read clutch circuit for completion upon closure of contacts M—5d. When this happens, magnet BM—3 and coil B—56 are also energized. The conditions for reading out the third selected form of tape T—b have thus been established.

Tape T—a is now at rest and the third selected paragraph of tape T—b, which is the last of the chosen series of six forms from the two tapes, is now being read out. When its start read designation is translated, coil B—54 is energized, closing contacts B—54b, and since coil B—43H is now energized, contacts B—43d, in series with the B—54b contacts, are also closed, causing the following circuit (Fig. 15c) to form:

*Coil B—37P circuit.*—Side Lt, coil B—37P, contacts B—43d, B—54b, side Rt.

Coil B—37P closes its a contacts to form the following holding circuit:

*Coil B—37H circuit.*—Side Lt, coil B—37H, contacts B—37a, contacts B—48b, wire 180, contacts B—27b, side Rt.

Coil B—37H closes contacts B—37b, preparing the circuit of coils B—47P and B—48P (Fig. 15c) for subsequent completion when the paragraph end designation of the third selected form of tape T—b is read out.

After the start read designation of the latter record form has passed the sensing station, the designations representing the body of data of the record form are transcribed. Following these designations, the paragraph end designation is sensed, causing paragraph end relay coil B—14 (Fig. 15e) to be energized. Coil B—14 opens contacts B—14a to break the B—22H circuit. Coil B—14 also closes contacts B—14c (Fig. 15c), and with contacts B—37b also closed, the following circuit forms:

*Coils B—47P and B—48P circuit.*—Side Lt, parallel coils B—47P and B—48P, contacts B—37c, B—14c, side Rt.

Coils B—47P closes contacts B—47c to form the following circuit:

*Coils B—47H and B—48H.*—Side Lt, in parallel through coils B—47H and B—48H, contacts B—47c, start key relay contacts R—24b, wire 180, contacts B—27b, side Rt.

Energization of coil B—48H opens contacts B—48a to break the Magnet M—5 Circuit #3. Coil B—48H also opens contacts B—48b to break the circuits of coils B—33H, B—35H, B—37H, B—39H, B—40H, B—43H, and B—44H, restoring their contacts to control condition.

Coil B—47H opens contacts B—47a (top of Fig. 15b) to prevent making of the (B) find or rewind clutch circuit even though the upper side of contacts B—22a has reclosed as a result of deenergization of coil B—22 by opening of paragraph end contacts B—14a.

Coil B—47H also opens contacts B—47b to form a break in the (B) Read clutch circuit line.

The third selected paragraph of tape T—b has been read out, and this tape now remains at rest.

All the electrical parts of the robot are now in restored condition, except for the coils A—47H and A—48H, and B—47H and B—48, which still are energized. Coils A—47H and B—47H are holding their contacts A—47a and B—47a, respectively, in the (A) and (B) clutch circuits, open, so that both tapes remain at rest with the end of their respective third transcribed forms "26" and "35" at the sensing stations. In order to effect a repeat selection and transcription of the chosen series of forms, the two tapes must be returned from the positions they occupy at the end of the just completed series to their first chosen form positions, which for tape T—a is form "4" and for tape T—b is form "19". To do this, the high speed clutch circuits of units A and B must be restored to effectively, respectively, by the reclosure of points A—47a and B—47a. This requires operation of the start key to form the Start key circuit, energizing coil R—24 to open contacts R—24b (Fig. 15c) common to the circuits of coils A—47H, A—48H, B—47H, and B—48H.

*Auto find control.*—At this point, the effect of plugging the auto find sockets 135(A) and 135(B) of the selecting means (see Fig. 10) will be explained. As indicated in Fig. 15a, sockets 135(A), when connected, shunt contacts A—47a, and reference to Fig. 15b shows that sockets 135(B), when plugged, shunt contacts B—47a. The connected sockets 135(A), therefore, take the place of contacts A—47a in the (A) find and rewind clutch circuits. Consequently, when the paragraph end designation of the third selected form of tape T—a is read out and the coil A—22H deenergized to permit the upper side of contacts A—22a to reclose, with the sockets 135(A) plugged, the (A) Find clutch circuit is immediately established. Likewise, with sockets 135(B) plugged, the (B) Find clutch circuit is formed immediately upon completion of the read out of the third selected form of tape T—b.

Even through the auto find sockets of unit A are plugged to cause the first chosen form of tape T—a to be brought to the reading position in automatic sequence to its readout of the third chosen form of the preceding series, the read out of the first chosen form cannot begin until the start key is depressed to cause contacts R—24b to open and break the circuit of coil A—48H to permit contacts A—48a of the (A) Read clutch circuit to reclose (Fig. 15a). With regard to unit B, the finding of the first chosen form of tape T—a as an automatic sequence to the readout of the third form of the preceding series does not start the reading out of the first form until contacts B—47b (Fig. 15b) and M—5d close. Contacts B—47b close only as a result of the depression of the start key to cause contacts R—24b to open and break the circuit of coil B—47H. Further, contacts M—5d close only after the first chosen form of tape T—a is read out and as a result of the formation of the first Magnet M—5 circuit.

If, while the last selected form of tape T—a is being transcribed, the attendant holds the start key down, contacts R—24b will be open and the circuit for coils A—47H and A—48H through these contacts cannot form when the end of paragraph symbol of the form is read out. If coils A—47H and A—48H are not energized, the Magnet M—5 circuit #3 cannot form, nor can the A—33H, 35H, 37H, 39H, 40H, 43H, and 44H coils be deenergized. Moreover, if, for example, selector 6 has been skipped, B unit coils B—47H and B—48H will have been energized before the reading out of the form selected, for example, by selector 5, in a manner which will be explained later. In that event depression of the start key, while transcription of the form of tape T—a is taking place, will open contacts R—24b, which would result in deenergization of coils B—47H and B—48H were not provision made for routing the circuit through another path. The deenergization of coils B—47H and B—48H at this time would permit the Magnet M—5 #3 circuit to form as soon as the last form of selector 5 had been completely read out and, if meanwhile the first selected form of tape T—b has been brought to the sensing station, the readout of the latter form will begin immediately after readout of the last selected form of tape T—a. The operation of the start key during transcription of the last selected form of tape T—a may be necessary in order to restart operations after the stop key has been depressed or after operations have been interrupted by a manual insert designation.

To assure coils A—47H and A—48H being energized as a result of completion of the readout of the last selected form of tape T—a, and to prevent coils B—47H and B—48H, if previously energized, from being deenergized while the last form of tape T—a is being transcribed, the contacts AM—3i, in shunt with contacts R—24b (Fig. 15c) are provided. These contacts are closed whenever a form of tape T—a is being read out because of energization of magnet AM—3 by the branch circuit formed when the (A) Read clutch circuit is established (see Fig. 15a).

If the start key is depressed while the last selected form of tape T—b is still being read out, and no provisions were made for then shunting contacts R—24b, the previously energized coils A—47H and A—48H would be deenergized. Contacts R—24b are always shunted, during readout of a form of tape T—b, by contacts B—56a (Fig. 15c), because of energization of coil B—56 (see Fig. 15b) whenever the (B) Read clutch circuit is in operative condition. If coil A—48H were deenergized during read out of the last selected form of tape T—b, then contacts A—48c (Fig. 15b) would open, breaking circuit #3 of magnet M—5, and contacts M—5d would open, causing the (B) Read clutch circuit to break, so that the reading out of the last selected form of tape T—b would be unfinished. Further, contacts M—5a would reclose, permitting reading of the first form of the series from tape T—a to start immediately if this first form has already been re-selected because of the (A) auto find sockets being plugged.

In above manner, means are provided to prevent deenergization of coils A—47H, A—48H, B—47H, and B—48H until the last selected forms of each of the record tapes have been completely transcribed.

*The repeat selection of the first chosen forms*

The tape T—a, at the end of the read out of the first and subsequent series of chosen forms, has the end of paragraph designation of its third selected form "26" at the sensing station. The tape T—b has the end of paragraph designation of its third selected paragraph "35" at its sensing station. When the auto find sockets 135 are not plugged, the operation of the start key is required, as explained above, to initiate the repeat selection of the first chosen forms of tapes T—a and T—b. When the auto find sockets are plugged, the hunt for the first chosen paragraph of each tape begins automatically after the last chosen paragraph of the tape has been read out. In either event, the (A) Find clutch and the (B) Find clutch circuits are made, causing advance of the tapes in the normal direction. Since, in the assumed example, the first chosen forms of the tapes lead the third selected forms, the advance of the tapes in the normal direction will continue until the record length of each tape is depleted from the front pool. When this happens, the paper sensing assembly (Figs. 4 and 6) of the front spool of each unit is rocked to open the associated upper switch 65—f′ and close the lower switch 65—f. Reference to Fig. 15a indicates that opening of switch 65—f′(A) forms a gap in the (A) Read clutch circuit, and reference to Fig. 15b indicates that opening of switch 65—f′(B) similarly forms a gap in the (B) Read clutch circuit. These contacts serve as safety means to prevent the tapes from being removed from the front spools while the tapes are being moved by the read clutches at reading speed.

Referring to Fig. 15a, the closure of normally open front paper switch 65—f(A) due to depletion of the punched length of the tape T—a from the front spool, forms the following circuit:

*Second auto rewind coil A—29 circuit.*—Side Lt, coil A—29, contacts 65—f(A), side Rt.

Coil A—29 closes contacts A—29b to form the holding circuit through contacts A—54a and rear paper contacts 65—r(A).

The closure of front spool contacts 65—f(B) similarly establishes a second auto rewind coil B—29 circuit, followed by a holding circuit through contacts B—29b, contacts B—54a, and rear spool contacts 65—r(B).

Coil A—29, upon energization, opens the lower side of contacts A—29a and closes the upper side, thereby breaking the (A) Find clutch circuit and making the (A) Rewind record finding circuit. The first chosen form of tape T—a will now be re-selected under control of selector 1 (Fig. 15c) during rewind feed of the tape.

In a similar manner, energization of coil B—29 shifts the feed of the tape T—b automatically from the find clutch to the rewind clutch to cause the first chosen form of the tape to be re-selected under control of selector 2 (Fig. 15d).

The read out of the re-selected first form of tape T—a begins immediately after its selection if the start key has been depressed prior to the initiation of the repeat selection to cause coil A—48H to be deenergized, permitting contacts A—48a (bottom of Fig. 15a) to reclose. If the auto find sockets had been plugged to cause automatic initiation of the re-selection after the preceding series had been finished then the read out of the re-selected first form awaits operation of the start key to cause contacts A—48a to reclose.

The readout of the re-selected first form of tape T—b awaits completion of the readout of the first selected form of tape T—a, as explained before.

The successive forms of the chosen series are then read out in the manner outlined previously.

*Rewind control by switches SW—1 and SW—2.*—In the assumed example, the first chosen form "4" of tape T—a leads the third selected from "26" and is past the sensing station at the end of the read out of the third form. Likewise, the first form "19" of tape T—b leads the third chosen form "35". If rewind switches SW—I and SW—2 (Fig. 15a) had been closed and the auto find sockets 135 also plugged, rewind feed of the tapes would have started immediately upon the readout of the third chosen forms of the tapes. With the switches SW—I and SW—2 open and the auto find sockets plugged, the re-selection of the first chosen forms is effected, as explained before, by a normal find feed followed automatically by a rewind feed. However, for the assumed example, time can be saved in the re-selection of the first chosen forms by closing rewind switches SW—I and SW—2.

It will be recalled that coil A—37H is energized by the readout of the start read designation of the third chosen form of tape T—a, and that coil B—37H is energized by the reading of the start read designation of the third chosen form of tape T—b. Accordingly, the lower side of contacts A—37a, in series with the switch SW—I, is closed before the coil A—14 is energized by the reading of the paragraph end designation of the third selected form of tape T—a, and contacts B—37c are similarly shifted before the end of paragraph coil B—14 is energized.

Considering tape T—a, when the paragraph end designation of the third selected form is read out, then coil A—14 is energized, closing contacts A—14d (right center of Fig. 15a), and with contacts A—37a in shifted condition and switch SW—I closed, a circuit is completed through rewind relay coil A—29, energization of which is held by closure of contacts A—29b. At the same time, coil A—14 opens contacts A—14a to break the circuit of selecting coil A—22 (Fig. 15b), causing contacts A—22a to return to normal condition (bottom of Fig. 15a). The closure of contacts A—14c (bottom of Fig. 15b) also results in establishing the circuit of coils A—47H and A—48H. Opening of contacts A—48b breaks the circuit of coil A—37H, but, by this time, energization of the rewind relay coil A—29 is being maintained through its stick circuit extending through contacts A—29b, start read relay contacts A—54a, and spool contacts 65—r(A). Now, with auto find sockets 135(A) plugged, the closure of the upper side of contacts A—29a results in establishing the (A) Rewind record finding circuit to effect rewind feed of tape T—a, immediately ofter reading out of the third selected form of the tape, in order to re-select the first chosen form for the repeat series.

With regard to unit B, the closure of the lower side of contacts B—37c (Fig. 15a), at the beginning of the readout of the third selected form of tape T—b, immediately closes the circuit of rewind control coil B—29, provided switch SW—2 is closed. Coil B—29 is then energized through contacts B—29b, start read contacts B—54a, and spool contacts 65—r(B). At this point, selecting coil B—22 is still energized and holding the upper side of contacts B—22a open. When the readout of the third selected form of tape T—b is completed, coil B—22 is deenergized, the upper side of contacts B—22a reclose, and with auto find sockets 135(B) plugged, and the upper side of contacts B—29a now also closed, rewind clutch solenoid 116—RW(B) is energized, causing re-selection of the first chosen form of tape T—b in a rewind direction immediately upon completion of the readout of the third chosen form.

*Other rewind controls.*—It may be noted that if the second chosen form of tape T—a leads the first chosen form, then switch SW—3 should be closed to cause selection of the second form of tape T—a during rewind feed. The energization of rewind control coil A—29 when switch SW—3 is closed depends on the closure of contacts A—33c. Energization of coil A—33H is effected when the start read designation of the first selected form of tape T—a is read out. At this point, coils A—35H and A—37H have not yet been energized, and contacts A—35c and A—37a are in normal condition. Consequently, with switch SW—3 closed, when the paragraph end designation of the first selected form of tape T—a is read out, energizing coil A—14 to close contacts A—14d, a circuit is formed through coil A—29, which is held through its stick contacts A—29b and contacts A—54a until the start read designation of the second chosen form is read out to cause the latter contacts to open.

The energization of coil A—29 shifts its points A—29a to cause energization of rewind solenoid 116—RW(A) upon the return of contacts A—22a to normal condition at the end of the readout of the first chosen form of tape T—a. Thus, with switch SW—3 closed, the second form of tape T—a is selected during rewind feed of the tape.

In a similar manner, with switch SW—4 closed, the second form of tape T—b is selected during rewind feed.

If switch SW—6 were closed, the rewind feed for selection of the third chosen form of tape T—b would be effected in a manner similar to that explained hereinbefore for rewind feed selection of the third chosen form of tape T—a.

If the second or third chosen form of a tape leads the preceding selected form and the required rewind switch SW has not been closed, then the find clutch solenoid will be energized and the tape fed in the normal direction until depleted from the front spool, without finding the chosen form. The normally open front spool contacts 65—f then close, and the rewind control coil A—29 or B—29 is energized to cause automatic shifting of the feed of the tape from the find clutch to the rewind clutch, and the chosen form of the tape will be found during rewind feed.

*Variations in form selection*

The selection and transcription of a series of six forms, three from each tape, have been described. As an example, the forms "4", "9", and "26" of tape T—a and the forms "19", "29", and "35" of tape T—b were chosen. It may be understood from the previous explanation that the forms of a tape to be selected in succession need not be in progressive numerical order. Thus, forms "9", "4", and "26", or "26", "4", and "9", or "9", "26", and "4" of tape T—a could have been successively selected.

In the assumed example, after the series of six forms, record entities, or record bodies was transcribed, the machine automatically stopped. This permitted the attendant to eject the sheet on which the data of the six record entities had been typed and to insert a new sheet in position to receive the repeat transcription of the series of record entities. The repeat transcription was started by depressing the start key. The flexibility of the machine allows considerable variation in the number of record bodies or entities constituting a series to be transcribed on a sheet. The series may constitute: one form only, chosen from tape T—a; two forms, the first chosen from tape T—a and the next from either tape T—b or tape T—a; three forms, all chosen from tape T—a or the first chosen from tape T—a, the second from tape T—b, and the third from either tape T—a or T—b; four forms, the first from tape T—a, the second from tape T—b, and the others from either tape T—a or T—b; and five forms, the first four taken in alternation from tapes T—a and T—b, and the last from either tape. The machine not only permits variation in the size of the series or the number of forms in a series, but also permits selection of different successive series for transcription. Thus, the machine may be set to choose: a single form of tape T—a for one sheet and a series of five forms, alternating between tapes T—b and T—a, for the next sheet; a first series of two forms from tapes T—a, T—b, and T—a, and a second series four forms; a first series of three forms from tapes T—a, T—b, and T—a, and a second series of three forms from tapes T—b, T—a, and T—b; a first series of two forms from T—a and T—b, a second series of two forms from T—a and T—b, and a third series of two forms from T—a and T—b; a first series of two forms from tapes T—a and T—b, a single form of tape T—a, and a series of three forms from T—b, T—a, and T—b; a first series of three forms from T—a, T—b, and T—a and a second series of two forms from T—b and T—a; and many other variations in the selection of different successive series and the sizes of the selected series.

A few illustrative examples of the flexibility of the machine will be given.

*Repeat transcription of one form*

If only one form is to be repeatedly selected and transcribed, this form is chosen from tape T—a by setting up selector 1 to the desired form and by plugging the zero sockets 133 of selectors 2 and 3 to the sockets 131 of these selectors. Preferably, the auto find sockets 135(A) are also plugged to cause automatic reselection of the chosen form and the rewind switch SW—1 closed to cause re-selection of the form in a rewind direction.

Assume, for example, that selector 1 is set to "4" and that form "4" of tape T—a is in a position past the sensing station. The operator now depresses the start key to close the Start key circuit (Fig. 15a) which is followed by the Start relay circuit. Start relay coil R—57 closes its contacts R—57a, establishing the (A) Find clutch circuit, causing the tape T—a to move to the limit of its travel in the normal direction since form "4" is assumed to be past the sensing station. When tape T—a is at the limit of its normal travel, front spool contacts 65—f(A) close, picking up rewind control coil A—29, which is held through contacts A—29b, start relay contacts A—54a, and rear spool contacts 65—r(A). Coil A—29 closes the upper side of its A—29a contacts, automatically shifting feed of the tape from the find clutch to the rewind clutch. During the rewind travel of the tape, its paragraph "4" identification is sensed and the (A) Selector 1 Record selecting circuit established. Selection coil A—22 thereupon closes the lower side of its A—22a contacts, shifting the feed of the tape to the read clutch and also energizing magnet AM—3. The start read designation of form "4" causes energization of coil A—54 to open contacts A—54a, breaking the holding circuit of rewind control relay coil A—29. Coil A—33P is also picked up by closure of start read contacts A—54b (Fig. 15b), causing coil A—33H to be energized and held through contacts A—33a, A—48b, and B—27b. The successive designations of tape T—a form "4" are then read out.

When the paragraph end designation is analyzed, coil A—14 is energized, and contacts A—14a (Fig. 15b) open to break the circuit of coil A—22. The (A) Read clutch circuit and the shunt circuit of magnet AM—3 thereupon open. The closure of paragraph end relay contacts A—14c, in conjunction with already closed A—33b contacts, energizes coils A—39P and A—40P, followed by energization of coils A—39H and A—40H. Magnet A—40 closes the lower side of its A—40a contacts (middle of Fig. 15c), shifting the form selection to selector 3 which is now plugged to zero. As a result the following circuit is established:

*Selector 3 skip circuit (coil A—51).*—Side Lt, coil A—51, a zero socket 133 of selector 3, the plug connection 132 to a socket 131, the jumper to another socket 131, the lower side of contacts A—40a, the upper side of contacts A—44a, side Rt.

Coil A—51 closes contacts A—51a (Fig. 15a) to complete a circuit through rewind control coil A—29 extending through rewind Switch SW—1. Coil A—29 shifts its points A—29a to cause energization of rewind clutch solenoid 116—RW(A), and tape T—a is moved in a rewind direction for re-selecting chosen form "4" under control of selector 1. To enable reselection to occur under control of selector 1, contacts A—40a (Fig. 15c) must be restored to normal and coil A—40H must be deenergized. This occurs as a result of closure of contacts A—51b (upper part of Fig. 15c), which replace contacts A—37c in forming the circuit of coils A—47P and A—48P, followed by the circuit of coils A—47H and A—48H held through contacts R—24b.

Magnet A—48 opens contacts A—48b (bottom of Fig. 15b), breaking the circuits of coils A—33H, A—39H, and A—40H. Contacts A—40a return to normal condition, placing the selection of a form of tape T—a under control of selector 1 (Fig. 15c). The finding of form "4" energizes coil A—22H to close the lower side of its contacts A—22a (Fig. 15a), but reading of the selected form cannot begin until coil A—48 is deenergized to permit reclosing of contacts A—48a of the (A) Read clutch circuit and of Magnet AM—3 circuit. The deenergization of coil A—48H occurs when the operator depresses the start key to energize coil R—24 for opening contacts R—24b (Fig. 15c). The machine then starts a repeat transcription of the chosen form "4" of tape T—a.

The description of the repeated selection and transcription of a single form of tape T—a has, thus far, been concerned only with unit A. The operations affecting unit B will now be described. With selector 2 plugged to zero, the following circuit is closed (Fig. 15d):

*Selector 2 skip circuit (coil B—51).*—Side Lt, coil B—51, a zero socket 133 of selector 2, the plug connection to a socket 131, the jumper to another socket 131, wire 150, the upper sides of contacts B—40a and B—44a, side Rt.

Coil B—51 opens contacts B—51a which are common to the (B) find, rewind and read clutch circuits.

Accordingly, tape T—b remains stationary.

Coil B—51 also closes contacts B—51b (Fig.

15c), shunting contacts B—37b and B—14c, to close the circuit of coils B—47P and B—48P, followed by the circuit of coils B—47H and B—48H. Coil B—48H opens contacts B—48a (right, center of Fig. 15b), preventing formation of any circuit through magnet M—5.

A series of two forms of tape T—a

The machine may set for repeated transcription of a series of two chosen forms of tape T—a. For this result, selector 1 is plugged to the first desired form of the series and selector 3 to the second form of the series, while selectors 2 and 5 are plugged to zero.

The selection of the first form of the series under control of selector 1 and the reading out of this form are the same as described for the first example, as are also the operations with respect to unit B. At the end of the readout of the first form, coils A—33H, A—39H, and 40H are energized, and coil A—22 is deenergized. Coil A—40H shifts its contacts A—40a (middle of Fig. 15c), but this time, with the zero sockets of selector 3 unplugged, coil A—51 is not energized at the end of the readout of the first selected form. Instead, the shifting of the A—40a contacts places the selection of the next form under control of selector 3 which has been plugged to choose the second form of the series. The closure of contacts A—39b (near the bottom of Fig. 15a) also establishes the Magnet AM—1 circuit. The selection of the second form of the series, under control of selector 3, now takes place, the selecting circuit extending through the lower sides of the contacts AM—1a to g (Fig. 15c) and the lower side of contacts A—40a. When the second form is found, magnet A—22 is energized, placing the (A) read clutch in effect, and reading out of the second form begins. The start read designation of this form causes contacts A—54b (Fig. 15b, at the bottom) to close and, with contacts A—39d closed, the circuit of coil A—35P, followed by the circuit of coil A—35H, is established. The paragraph end designation of the second form causes contacts A—14c to close, and the circuit of coils A—43P and A—44P (Fig. 15c, at top) is established, followed by the circuit of coils A—43H and A—44H.

Coil A—44H closes the lower side of its contacts A—44a (middle of Fig. 15c), and with the zero sockets 133 of selector 5 plugged to sockets 131, the following circuit forms:

*Selector 5 skip (coil A—51).*—Side Lt, coil A—51, a socket 133, the plugwire to a socket 131, the jumper to another socket 131, wire 170, the lower side of contacts A—44a, side Rt.

Coil A—51 closes contacts A—51b (Fig. 15c, near top) to form the circuit of coils A—47P and A—48P, followed by the circuit of coils A—47H and A—48H. Contacts A—47a open, breaking the rewind and find clutch circuit line of unit A (see bottom of Fig. 15a). Contacts A—48a open, insuring the breaking of the (A) Read clutch circuit line. Contacts A—48b (Fig. 15b) open, breaking the circuits of coils A—33H, A—35H, A—39H, A—40H, A—43H, and A—44H.

A repeat transcription of the series of two forms, chosen by selectors 1 and 3, may be initiated by depressing the start key.

A series of three forms

The machine may be set to transcribe a series of three forms. If these three forms are to be taken from tape T—a, then selectors 1, 3, and 5 are plugged to choose the successive forms, and selector 2 is plugged to zero. The operations of selecting and transcribing the first two forms under successive control of selectors 1 and 3 are the same as in the preceding example. The selection and reading out of the third form under control of selector 5 are accomplished in the same manner as explained in connection with the series of six forms. The control with regard to unit B is the same as in the last two examples.

The series of three forms may be made up of a first form from tape A—a, chosen by selector 1; a second form from tape T—b, chosen by selector 2; and a third form, either from tape T—a chosen by selector 3 or, alternatively, from tape T—b, chosen by selector 4.

Assuming the three forms are chosen by selectors 1, 2, and 3, then the selectors 4 and 5 are plugged to zero. The operation of selecting and reading out the first form of tape T—a chosen by selector 1 is the same as in the preceding example. The start read designation of the first form causes coil A—33H to be energized. The paragraph end designation of the form causes coils A—39H and A—40H to be energized. While the first form of tape T—a is being selected and read out, the second form of the series is being selected, under control of selector 2, from tape T—b, in the same manner as described previously in connection with the transcription of a series of six forms. The readout of the second form of the series cannot begin until the first form of the series is read out. When the readout of the first form is completed, coil A—39H is energized, closing contacts A—39c (Fig. 15b) to make the Magnet M—5 circuit #1. Magnet M—5 closes contacts M—5d to establish the (B) Read clutch circuit and the shunt circuits of magnet BM—3 and coil B—56. Magnet M—5 shifts its points 1 to 10 (Fig. 15d) to place the translating coils R—1 to R—10 under control of the unit B sensing means. The second form of the series, selected by selector 2 from tape T—b, is then read out. The start read designation of the second form causes coil B—54 to be energized, in turn resulting in energization of coil B—33P (top of Fig. 15c) followed by energization of coil B—33H, held through contacts B—48b and B—27b. The paragraph end designation of the second form causes energization of coil B—14 to close contacts B—14c (Fig. 15c), which join with contacts B—33b in closing the circuit of coils B—39P and B—40P, followed by the circuit of coils B—39H and B—40H held through contacts B—48b and B—27b.

Coil B—40 shifts contacts B—40a (Fig. 15d), and with the zero sockets 133 of selector 4 plugged to sockets 135, a circuit is completed through coil B—51. Contacts B—51a (Fig. 15b) open to prevent formation of any of the clutch circuits of unit B. Contacts B—51b (Fig. 15c) close to cause the circuit of coils B—47H and B—48H to be established. Coil B—48 opens contacts B48b to deenergize coils B—33H, B—39H, and B—40H. Tape T—b now remains at rest until a new series is started.

While the second form of the series was being taken from tape T—b, the third form of the series was being sought on tape T—a. Since coil A—40H was energized by the reading out of the first form, its contacts A—40a (Fig. 15c) have been shifted. Coil A—39H also was energized, simultaneously with coil A—40H, and contacts A—39b (Fig. 15a) were closed to energize magnet AM—1, which shifted its points a to g. Consequently, the selection of the third form of the series takes place under control of selector 3. When this selection is completed, contacts A—22a (Fig. 15a) are shifted, and when magnet M—5 is deenergized as a result of opening of circuits B—39a (Fig. 15b) due to completion of the reading out of the second form of the series, the contacts M—5a reclose. As a result, the read clutch circuit of unit A is established, and the third form of the series is read out. The start read designation of the third form causes coil A—35H (Fig. 15b) to be energized. The paragraph end designation of the third form causes coils A—43H and A—44H (Fig. 15c) to be energized. The consequent shifting of the points A—44A places the selector 5 in control, and with this selector plugged to zero, the coil A—51 is energized. Coil A—51 closes contacts A—51b (Fig. 15c) to cause the circuits of coils A—48H and A—48H to form. Contacts A—48b (Fig. 15b) thereupon open and coils A—33H, A—35H, A—39H, A—40H, A—43H, and A—44H are deenergized. Contacts A—48a and A—47a (Fig. 15a) open to prevent formation of any of the clutch circuits of unit A, and tape T—a now is at rest. A repeat service may be started by depressing the start key.

Assuming that the series is made up of a form of tape T—a, a second form of tape T—b, and a third form of tape T—b, the selectors 1, 2, and 4 are plugged to choose these forms, and selectors 3 and 6 are plugged to zero. The selection and reading out of the first form occur in the same manner as described for the preceding example. Following the readout of the first form from tape T—a, coils A—33H, A—39H, and A—40H stay energized. As coil A—40H was energized, it shifted points A—40a (middle of Fig. 15c) and with selector 3 plugged to zero, skip coil A—51 was energized after the readout of the first form of the series from tape T—a. Coil A—51 closed contacts A—51b (upper, right of Fig. 15c) to cause energization of coils A—47H and A—48H. Coil A—48H opened contacts A—48b to break the circuits of coils A—33H, A—39H, and A—40H, (Fig. 15b). Energization of coils A—47H and A—48H maintains their respective contacts A—47a and A—48a (lower, right of Fig. 15a) open to prevent making of any A unit clutch circuits, and tape T—a remains idle until the start key is depressed to initiate a repeat series.

Meanwhile, the second form of the series is being read out of tape T—b, and at the end of this readout, coils B—33H, B—39H, and B—40H (Fig. 15c) are energized. Contacts B—39c (near top of Fig. 15b) are closed to form a circuit through magnet BM—1, which shifts its a to g points (Fig. 15d), and with contacts B—40a also shifted, the selection of the third form of the series is placed under control of selector 4. Assuming that the third form of the series leads the second form of the series, both on tape T—a, the rewind switch SW—4 (Fig. 15a) is preliminarily closed. When the start read designation of the second form was read out, it resulted in energization of coil B—33H, closing contacts B—33c. When the paragraph end designation of the second form is read out, coil B—14 was energized to close contacts B—14d, in series with contacts B—33c and switch SW—4. Consequently, rewind relay coil B—29 was energized and held through its stick points, the start read relay points B—54a, and rear spool contacts 65—r(B). Coil B—29 shifted its points B—29a (top of Fig. 15b), causing the rewind clutch circuit of unit B to be established for feeding tape T—b in a rewind direction during the search for the third form of the series under control of selector 4. As soon as this third form is found, its readout begins. This is because magnet M—5 (Fig. 15b) has been energized through now closed contacts A—48c and B—48a and has closed contacts M—5d, to establish the (B) Read Clutch Circuit as soon as selection coil B—22 is energized to shift points B—22a. Also, points "1" to "10" of magnet M—5 (Fig. 15d) are shifted to transfer control of coils R—1 to 10 to unit B.

At the end of the readout of the third form of the series from tape T—b, coils B—35H, B—43H, and B—44H (Fig. 15c) are energized. Coil B—44H shifts its contacts B—44a (Fig. 15d) to connect selector 6 to the right current side Rt and with this selector plugged to zero, coil B—51 is energized. Contacts B—51b (Fig. 15c) close to cause energization of coils B—47H and B—48H. Contacts B—48a (Fig. 15b) open to break the circuit of magnet M—5. Contacts B—51a open to prevent making of any clutch circuit of unit B. Contacts B—48b (Fig. 15c) open to break the circuits of coils B—33H, B—39H, B—40H, B—35H, B—43H, and B—44H. The series of three forms successively taken from tape T—a, tape T—b, and tape T—b, has been completed and the robot is at rest. A repeat series is started by depressing the start key.

At this time, it may be pointed out that if the third form of the series were behind the second form, the rewind switch SW—4 would not be closed, so that the third form would be sought, after readout of the second form, in the normal direction. It would then be preferable to close the rewind switch SW—2 in order to re-select the second form of tape T—b by moving it in the rewind direction. Thus, after readout of the third form, skip coil B—51 is energized under control of the selector 6, closing contacts B—51c (right, center of Fig. 15a) to pick up rewind relay coil B—29 which shifts its points B—29a (Fig. 15b) to cause the rewind clutch solenoid to be energized for feeding the tape T—b in the rewind direction until the second form of the series is re-selected under control of selector 2.

*Series of four and five forms*

A series of four forms may be selected and read out. This series may be made up of a first form of tape T—a, a second form of tape T—b, a third form of tape T—a, and a fourth form of tape T—a. For this series, selectors 1, 2, 3, and 5 are plugged for the successive forms and selector 4 is plugged to zero. The readout of the first three forms is the same as previously described for the series of three forms successively taken from tapes T—a, T—b, and T—a. The control by selector 4 is the same as in the latter example in which this selector also was plugged to zero. Differing from the latter example, selector 5 is plugged to a fourth form and the selection and readout of this form is the same as described for the series of six forms.

A series of four forms successively taken from tapes T—a, T—b, T—a, and T—b may be transcribed. The selectors 1, 2, 3, and 4 are plugged to choose the forms of this series, and selectors 5 and 6 are plugged to zero.

A series of four forms may be made up successively from tapes T—a, T—b, T—b, and T—b, by plugging selectors 1, 2, 4, and 6 to the desired forms and selector 3 to zero.

A series of five forms may be successively taken from tapes T—a, T—b, T—a, T—b, and T—a, in which case selector 6 is plugged to zero.

A series of five forms may be made up from tapes T—a, T—b, T—a, T—b, and T—b, in which case the selector 5 is plugged to zero.

*General result of zero plugging.*—It may be understood from the description of the different series that the zero plugging of any selector, except selector 1 which is always plugged to choose the first form, causes the same control operations to take place with respect to the unit related to the selector plugged to zero as though the third form of the tape of this unit had been read out. Thus, plugging selector 2 to zero causes coils B—47H and B—48H to be energized, which is a manifestation of the completion of operations of unit B, normally occurring after readout of three selected forms of tape T—b. Plugging selector 4 to zero causes coils B—47H and B—48H to be energized after one form of tape T—b is read out. Plugging selector 6 to zero causes the coils B—47H and B48H to be energized after two forms of tape T—b are read out. Plugging selector 3 to zero causes coils A—47H and A—48H to be energized after one form of tape T—a has been read out, instead of after completion of readout of three forms of this tape. Plugging selector 5 to zero causes coils A—47H and A—48H to be energized after only two forms have been read out of tape T—a.

*The insert sockets (134) of the selecting means*

As shown in Fig. 10, there is a pair of insert sockets 134 between each pair of selectors. When a pair of insert sockets is plugged, automatic typing is interrupted after the form selected by the selector at the left of the insert sockets has been transcribed and before the data of the form selected by the selector at the right of the insert sockets is transcribed.

Assume, for example, that the insert sockets between selectors 1 and 2 are plugged to each other. After the form selected by selector 1 has been transcribed, readout of the form selected by selector 2 begins. The first designation of the latter form is the start read designation which follows the form identification and precedes the designations of the body of data to be typed. The reading of the start read designation of the form selected by selector 2 causes energization of start read relay coil B—54 to close contacts B—54c (lower portion of Fig. 15a), and with the insert sockets between selectors 1 and 2 plugged, the following circuit forms (Fig. 15a):

(B) *Insert relay circuit (coil R—16H).*—Side Lt, coil R—16H, normally closed start key relay contacts R—24c, contacts B54c, the lower side of contacts B—40c, the plugged pair of sockets 134 (1—2), side Rt.

Coil R—16H closes stick contacts R—16c to maintain the coil energized through the following holding circuit:

*Insert relay holding circuit.*—Side Lt, coil R—16H, contacts R—24c, contacts R—16c, rewind relay contacts A—27d, side Rt.

Coil R—16H opens contacts R—16b (Fig. 15b) in the (B) Read Clutch Circuit. The deenergization of the solenoid 116—RD(B) and of brake relay coil B—31 results. Coil B—31, upon deenergization, permits contacts B—31a (middle of Fig. 15b) to reclose, energizing brake magnet 126 (Fig. 15b). The feed of tape T—b is thus interrupted. In order to apply the brakes to the unit B feed means as soon as the insert coil R—16H is energized, without being delayed by the reluctance of the solenoid 116—RD(B) and coil B—31, the coil R—16H closes contacts R—16d to form the following circuit (Fig. 15b):

(B) *Brake applying circuit.*—Side Rt, contacts R—16d, the lower side of contacts M—5e (magnet M—5 is energized during readout of a form of tape T—b), brake magnet 126(B), side Lt.

The immediate application of the brake slows down the feed of tape T—b before deenergization of solenoid 116—RD(B) is effectively completed as a result of opening of insert relay contacts R—16b. In this manner, it is made certain that the feed of tape T—b will be interrupted before the designation following the start read designation reaches the sensing station.

Meanwhile, tape T—a may be feeding in order that a second form thereof be selected. The selection causes contacts A—22a (Fig. 15a) to shift, but the read clutch circuit cannot form until contacts M—5a reclose, which does not occur until after the form of tape T—b, selected by selector 2, has been read out. Furthermore, since insert relay contacts R—16a are open, the read clutch circuit of unit A cannot form regardless of the condition of contacts M—5a.

Thus, the plugging of the insert sockets between selectors 1 and 2 has interrupted automatic typing after the body of data of the form selected by selector 1 has been transcribed. The automatic typing may be resumed by depressing the start key to energize coil R—24, which opens contacts R—24c to break the circuits of coil R—16H. Contacts R—16b reclose to reestablish the (B) Read clutch circuit. Contacts R—16d open to break the (B) Brake applying circuit. The reading out of the form selected by selector 2 from tape T—b now is resumed.

If the insert sockets between selectors 2 and 3 are plugged, the automatic typing is interrupted after the form chosen by selector 2 is transcribed and upon the energization of coil A—54 resulting from the translation of the start read designation of the form selected by selector 3 from tape T—a. The first form has been previously read out and, consequently, coil A—40H is energized, closing contacts A—40c, and with start read coil A—54 energized to close contacts A—54c, the following circuit forms (Fig. 15a):

(A) *Insert relay circuit.*—Side Lt, coil R—16H, contacts R—24c, contacts A—54c, contacts A—40c, the lower side of contacts A—44c, plugged sockets 134 (2—3), side Rt.

The closing of contacts R—16c forms the holding circuit of the coil R—16H. During the reading out of a form of tape T—a, magnet M—5 is deenergized and the upper side of contacts M—5e (Fig. 15b) is closed, causing the brake magnet 126(A) to be energized when contacts R—16d close as a result of energization of coil R—16H. The opening of contacts R—16a breaks the (A) Read clutch circuit, interrupting readout of tape T—a. The opening of contacts R—16b prevents reading of tape T—b. Automatic typing is thus interrupted and may be resumed by depressing the start key to energize coil R—24, which opens contacts R—24c to deenergize insert coil R—16H.

If the insert sockets between selectors 3 and 4 are plugged, automatic typing is interrupted after the second form of tape T—a has been read out. At that time, coil B—40H is already energized, as a result of the readout of the first form of tape T—b, and the upper side of contacts B—40c is closed, routing the circuit of coil R—16H through sockets 134 (3—4).

If the pair of insert sockets between selectors 4 and 5 is plugged, the automatic typing is interrupted after the reading out of the second form of tape T—b. At that time, as a result of the previous reading out of the first two forms of tape T—a, coils A—40H and A—44H are energized. Coil A—40H has closed contacts A—40c and coil A—44H has closed the upper side of contacts A—44c, routing the circuit of coil R—16H through sockets 134 (4—5).

If the insert sockets between selectors 5 and 6 are plugged, the automatic typing is interrupted after the third form of tape T—a has been read out. As a result of the previous readout of the first two forms of tape T—b, coils B—40H and B—44H are energized, shifting their "c" contacts to upper position, and, thereby, routing the circuit of coil R—16H through insert sockets 134 (5—6).

Insert sockets between selectors 6 and 1 are unnecessary, since automatic typing is interrupted, in any case, after the readout of the form chosen by selector 6.

In above manner, the automatic transcription may be interrupted after any selected form has been transcribed. By plugging the insert sockets between the pairs of selectors 1—2, 2—3, 3—4, 4—5, and 5—6, the automatic typing may be interrupted after each of the six selected forms has been transcribed, enabling the operator, at each interruption, to eject the old sheet and insert a new sheet so that each of the six successive, selected forms may be transcribed on a different individual sheet. By plugging the insert sockets between the pair of selectors 1 and 2, the first form may be typed on one sheet and a series of the next five forms on a different sheet. By plugging the insert sockets between selectors 2 and 3, a first series of two forms may be typed on one sheet and a second series of four forms on another sheet. By plugging the insert sockets between selectors 3 and 4, two successive series of three forms may be typed on two different sheets. By plugging the insert sockets between selectors 2 and 3 and between the selectors 4 and 5, three successive series, each of two forms, may be typed on three different sheets. Other variations on the plugging of the insert sockets are possible, as is apparent from the previous description, to provide for various other separations in series of different successive forms.

Moreover, the interruption in the automatic typing after any selected form has been tranfscribed may be combined with the skipping of selectors, by plugging them to zero, to provide for a considerable number of variations in the separation and selection of series of forms. Thus, with selectors 1, 2, and 4 plugged to desired forms and selectors 3 and 6 plugged to zero, if the insert sockets between selectors 1 and 2 are plugged, the first form, selected from tape T—a, may be transcribed on one sheet and the next two forms, both selected from tape T—b, transcribed on a different sheet. If, instead, the insert sockets between selectors 3 and 4 are plugged, the first two forms, selected from tapes T—a and T—b, may be transcribed on one sheet and the third form, selected from tape T—b, transcribed on another sheet. In the latter case, after the transcription of the first form of tape T—b, selected by selector 2, coil B—40H is energized, closing the upper side of contacts B—40c (Fig. 15a). With selector 3 plugged to zero, operation of unit A ceases and readout of the next form, selected by selector 4, begins. The start read designation of the latter form causes start read relay contacts B—54c (Fig. 15a) to close and, as the upper side of contacts B—40c are also closed and insert sockets 134—(3—4) plugged, the insert coil R—16H is energized, interrupting operation of the robot after the tranfscription of the first two forms, taken from tapes T—a and T—b.

To take another example, when selector 1 is plugged to select one form from tape T—a, selector 2 plugged to zero, selector 3 plugged to select another form of tape T—a, and selector 5 plugged to zero, the robot reads out two forms of tape T—a in automatic succession and none from tape T—b before stopping. This mode of operation may be varied by plugging the insert sockets between selectors 2 and 3, causing the robot to stop after the first form of tape T—a has been transcribed and enabling the second form, selected by selector 3, to be transcribed on a different sheet.

It should be noted that, in every case, that particular pair of insert sockets is plugged which precedes the selector for selecting the form which is to start a new series.

The interruption in the automatic typing after any form has been transcribed, due to selective plugging of the insert sockets, may be employed not only for enabling the operator to eject the old sheet and insert a new sheet for the following transcription, but, also, to enable the operator to type, manually, desired additional matter to follow the automatically typed matter before ejecting the sheet, or to type, manually, additional matter between two successively transcribed bodies of data on the same sheet, or to type matter on a new sheet to precede matter derived from any selected form.

*Manual insert designation control*

The automatic typing may be interrupted at any point by the use of a manual insert designation. The sensing of the manual insert designation 2—3—9 causes translating coils R—2, R—3, R—3', and R—9 to be energized. Referring to Fig. 15e, the closure of the armature contacts of these coils establishes the following circuit:

*Manual insert circuit (coil R—16P).*—Side Lt, contacts R—9a, normally closed start key relay contacts R—24d, coil R—16P, the 2—3 zone line, and, as in the other 2—3 zone circuits, to side Rt.

Coil R—16P closes contacts R—16c (Fig. 15a) to establish the Insert relay holding circuit which maintains coil R—16H energized until start key relay contacts R—24c are opened. Coil R—16H functions to the same effect as previously described, in connection with its energization under control of insert sockets 134, to interrupt automatic typing, enabling the operator to type, manually, any required insertion. To restart automatic typing from the point at which it was interrupted, the start key is depressed, energizing coil R—24 which opens contacts R—24c and R—24d to deenergize coils R—16P and R—16H.

*Optional carriage return*

The machine may be adjusted to provide for automatic carriage return and line spacing of the typing unit under control of a letter space or hyphen designation when the carriage is in a selected right hand margin zone. In this form of operation of the machine, hyphenated tapes are used. The hyphenated tape is punched with a hyphen designation between designations representing syllables of each plural syllable word. As explained previously under the heading "The typewriter," the right hand margin zone begins at the point where a normally open switch 36 (Fig. 12) is closed by an extension 33' of the right hand margin stop 33 and continues through eight letter spaces to the right hand margin limit. The margin zone control is broken upon carriage return due to opening of the normally closed switch 37 by an extension 39' of the left hand margin stop 39 (Fig. 12).

To adjust the robot for optional carriage return, all that need be done is to open a hand switch 190 (Fig. 15e) between the hyphen key solenoid 30 and the contacts R—10b. The hyphen designation is 1—2—10 and, with switch 190 closed, closure of contacts R—10b and of the 1—2 zone line causes energization of the hyphen solenoid regardless of the position of the carriage. With switch 190 open, the hyphen solenoid will not be energized unless the carriage is in the right hand margin zone. When the right hand margin zone is reached, contacts R—20a, shunting switch 190, are closed and, for the duration of the typing in this margin zone, the sensing of a hyphen designation causes energization of the hyphen key solenoid.

Contacts R—20a are closed by energization of a coil R—20 (Fig. 15b, left center) when switch 36 is closed by the right hand margin stop extension 33'. Coil R—20 closes stick contacts R—20b to hold this coil energized, through closed switch 37, for the duration of travel of the carriage in the right hand margin zone. If, while the carriage is in the right hand zone, a hyphen designation is sensed, the hyphen key solenoid 30 is energized by a circuit extending from the current side Rt through contacts R—10b now-closed contacts R—20a, the hyphen solenoid 30, and the closed 1—2 zone line, to the current side Rt.

At the same time, a parallel circuit is formed through a pick up coil R—18P and now-closed contacts R—20c. Coil R—18P closes contacts R—18c (left, center of Fig. 15b) to provide a circuit for coil R—18H, extending through contacts R—18c, R—20b, and switch 37. Energization of magnet R—18 opens contacts R—18a and R—18b, respectively in the (A) and (B) Read clutch circuits (see Figs. 15a and 15b) to interrupt reading feed of either tape. In order to stop the tape feed immediately, the coil R—18 closes contacts R—18d (right, center of Fig. 15b) to complete a circuit through the brake magnet 126 of unit A or B, depending on the condition of the M—5e contacts, which, in turn, depends on which of the tapes is being read out. By stopping the tape feed, the reading of the designation following the hyphen designation is delayed until after the hyphen has been printed and the cariage returned to the beginning of the next line.

When contacts R—18c close, a circuit is established through a coil R—53 (left, center of Fig. 15b) which extends from side Lt, through a 3,000 ohm resistance 191, coil R—53, contacts R—18c, R—20b, and switch 37, to side Rt. The resistance 191 reduces the pick-up speed of coil R—53, delaying its energization and the closing of its contacts R—53a. When contacts R—53a close, a circuit is established through a coil R—21, extending through contacts R—53a, R—20b, and switch 37.

Coil R—21 shifts its contacts R—21a and b (upper right of Fig. 15e) to provide an optional carriage return circuit extending from the side Lt, through contacts R—21a, carriage return key solenoid 30—CR, and contacts R—21b, to side Rt. Energization of solenoid 30—CR effects carriage return. It may be noted that the hyphen key solenoid circuit, coil R—18H circuit, coil R—53 circuit, and coil R—21 circuit are formed in succession. Due to this progression, the hyphen key is operated to complete printing of the hyphen before the carriage return key is operated to cause carriage return. This order of operation is made more certain by the use of the resistance 191 in series with coil R—53 to retard energization of the latter coil.

When the carriage returns, the left hand margin stop extension 39' opens switch 37, breaking the circuits of coils R—20, R—18, R—53, and R—21. The reclosure of contacts R—18a or R—18b causes reading of the tape to be resumed.

If it is desired to print a hyphen even though sensed while the carriage is not in the right hand margin zone, the hyphen designation is preceded by a shift designation and followed by a shift return designation. The sensing of the shift designation causes energization of coil R—12P (top of Fig. 15e) which, in turn, causes coil R—12H (Fig. 15b, center) to be energized. The magnet R—12 closes contacts R—12c, shunting margin zone relay contacts R—20a, to enable the hyphen designation analysis to effect energization of the hyphen solenoid even though the latter contacts are open and the hyphen is sensed while the carriage is in advance of the right hand zone. The hyphen key, in this case, is adapted to type a hyphen in lower and upper case positions. The shift return designation, following the hyphen designation, causes return to lower case conditions and deenergization of coil R—12H, in a manner described before.

When a space designation 1—3—10 is sensed while the carriage is in the right hand zone, a circuit is established as follows (near bottom of Fig. 15e):

Coil R—19P circuit.—Side Lt, contacts R—10c, in parallel through a resistance 192 and space solenoid 30—SP and through a coil R—19P and now-closed contacts R—20d, to the 1—3 zone line, the upper side of contacts R—3'b, the lower side of contacts R—2b, contacts R—1b, to side Rt.

Coil R—19P closes contacts R—19c to form a circuit through coil R—19H, which functions to the same effect as coil R—18H in interrupting reading of the tapes and causing carriage return operation.

The optional carriage return means avoids the limitations imposed by the use of carriage return designations punched after predetermined character designations of the record form. The use of carriage return designations restricts the automatically typed data to a fixed length of line, and, therefore, requires the operator to set the left and right hand margin stops for predetermined marginal widths in order to center the lines of automatically typed matter on the letter sheet. In those cases where a manual insertion is to be made, the length of which is variable, the fixed carriage return control results in an uneven right hand margin. Furthermore, with the fixed carriage return means, the vertical space on the sheet occupied by a body of automatically transcribed data is fixed and, therefore, does not take into account the possibility of variations in the number of transcribed bodies of data to be typed on a sheet. With the optional carriage return means, the left and right hand margins may be adjusted as desired and, yet, a substantially even right hand margin obtained because of the carriage return being automatically effected under control of space and hyphen designations when the carriage is in the selected right hand marginal zone. This permits an adjustment of the length of the automatically typed line and, therefore, in the vertical space occupied by a body of transcribed data. Thus the margins may be adjusted in accordance with the number of bodies of data to be transcribed on a single sheet. At the same time, manual insertions of any varying length may be typed without affecting the substantial straightness of the right hand margin. The hyphen control of the carriage return operation also permits the substantial justification of the right hand margin without departing from the rules of syllabification.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for operating on a plurality of indicia bearing record bodies, means to express the indicia of a record body, sequentially related, preliminarily and variably conditionable selectors for variably preselecting a series of bodies and one sequence or another in which the bodies of the series are to have their indicia subsequently expressed, means acting in conjunction with the selectors for cooperatively relating the preselected bodies of the series to the indicia expressing means, and means for causing the indicia expressing means to express the indicia of the preselected bodies of the series in the preselected sequence.

2. In a machine for operating on a plurality of indicia bearing record bodies, means to manifest the indicia of a body, preliminarily and variably conditionable means for variably preselecting a series of bodies to have their indicia manifested and including sequentially related settable selectors, each for preselecting one body of said series to be manifested in a sequential relation corresponding to the sequential relation of the selector, with at least two of the selectors being capable of interchangeably preselecting a particular body of the series to afford preselection of one sequence or another in which the series of bodies is to be manifested, means acting in conjunction with the selectors for cooperatively relating the series of bodies to the manifesting means, and means for causing the indicia of the bodies to be manifested by the manifesting means in the preselected sequence.

3. In a machine for operating on indicia bearing record bodies, means to transcribe the indicia of a body, preliminarily and variably conditionable means for preselecting a series of bodies to be transcribed and including sequentially related, variably settable selectors for variably preselecting a plurality of bodies to be transcribed in a sequence corresponding to the sequential relation of the selectors, each selector having a plurality of available, optional settings corresponding to different record bodies to preselect one of the latter bodies according to the setting given the selector, with at least two of the selectors having their settings corresponding to the same bodies of a particular group to afford preselection of one sequence or another in which the bodies of the series are to be transcribed, means acting in conjunction with the selectors for bringing the bodies of the series into cooperative relation to the transcribing means, and means for causing the indicia of the preselected bodies to be transcribed in the preselected sequence.

4. Apparatus for operating on indicia bearing record bodies, each provided with its own identifying designation, comprising means to express the indicia of a body, sequentially related, preliminarily and variably conditionable means for variably preselecting a series of bodies and one sequence or another in which the bodies of the series are to have their indicia expressed, means for sensing the identifying designations, means conjointly controlled by the variably conditionable means and the sensing means upon sensing of the identifying designations of the preselected bodies for cooperatively relating the preselected bodies to the indicia expressing means, and means for causing the indicia expressing means to express the indicia of the preselected bodies in the preselected sequence.

5. Apparatus for operating on a plurality of indicia bearing record bodies, comprising means to read out the indicia of one body at a time, a series of preliminarily and variably settable selectors, each variably settable to variably preselect any one of the plurality of bodies to be subsequently read out, variably conditionable means for preselecting a variable number of selectors to be effective, and means acting in conjunction with the effective selectors for bringing one preselected number or another of preselected bodies into cooperative relation to the readout means depending on the number of selectors preselected for effectivity.

6. In a machine for operating on a plurality of successively positioned indicia-bearing record bodies, a common operating means for operating on the bodies one at a time to express their indicia, mechanism for selecting a pair of the record bodies for indicia-expression by bringing them in automatic succession into indicia-expressing coaction with the common operating means, and preliminarily and variably conditionable devices for controlling said mechanism to select for the first of said pair of bodies, a record body which is either behind or ahead of the position of the second body of the pair.

7. In a machine for operating on a plurality of successively positioned indicia-bearing record bodies having a common feed path, a common operating means along said path for operating on the record bodies to express their indicia, mechanism for selecting a pair of record bodies for operation by bringing them in succession into indicia-expressing coaction with said common operating means, and preliminarily and variably conditionable devices for preliminarily choosing the pair of bodies to be selected and controlling said mechanism to select for the first of the pair of bodies one which is either ahead of or behind the position of the second body of the pair.

8. Apparatus for operating on a group of indicia bearing record bodies, comprising common means for reading out the indicia of one body at a time, a pair of preliminarily and variably settable, sequentially related selectors, each having a plurality of available settings corresponding to different bodies of the said group, to interchangeably preselect a pair of bodies of said group for readout in one sequence when one body of the pair has been preselected by one selector and the other body by the other selector or in another sequence when the selectors have reversely preselected the pair of bodies, and means successively controlled by the selectors according to their sequential relation for bringing the pair of bodies into cooperative relation to the readout means in the preselected sequence.

9. In a machine for operating on a plurality of indicia-bearing record bodies, common means for reading out the indicia of one body at a time, a pair of sequentially related selectors, each preliminarily and variably settable to preselect interchangeably any one of the plurality of record bodies, and common feed mechanism controlled by the selectors for bringing the preselected bodies in a sequence corresponding to the sequential relation of the selectors into cooperative relation with the common means to have their indicia read out.

10. In a machine such as described, separate supplies of indicia bearing record bodies, means for expressing the indicia of a body, a plurality of preliminarily and variably settable, sequentially related selectors for concurrently affording variable preselection of a series of bodies from the separate supplies and preselection of one sequence or another, with respect to the separate supplies, in which the preselected bodies are to have their indicia expressed, means acting in conjunction with the selectors for bringing the preselected bodies into cooperative relation to the indicia expressing means, and means for causing the indicia expressing means to express the indicia of the preselected bodies in the preselected sequence.

11. In a machine such as described, separate supplies of indicia bearing record bodies, means for reading out the indicia of a body, a plurality of preliminarily and variably settable, sequentially related selectors, each for preselecting any one of a plurality of record bodies, for concurrently affording variable preselection of a pair of bodies from either the same supply or the separate supplies to be read out in succession, means coacting with the selectors for bringing the preselected pair of bodies into cooperative relation to the readout means, and means effective in conformity with the sequential relation of the selectors for causing the readout means to read out the indicia of the pair of bodies preselected from either the same supply or the separate supplies in succession.

12. Apparatus for operating on indicia bearing record bodies, comprising means for manifesting the indicia of a body, sequentially related, preliminarily and selectively settable selectors for concurrently affording variable preselection of a series of record bodies to be manifested in a sequence corresponding to the sequential relation of the selectors, means acting in conjunction with the selectors for bringing the preselected bodies into cooperative relation to the manifesting means, automatic means for causing the manifesting means to manifest the indicia of the preselected bodies in the aforesaid sequence, and variably and preliminarily settable means for preliminarily conditioning the apparatus to interrupt operation of said automatic means after two or more of the preselected bodies of the series have been manifested and before manifesting of the remaining preselected bodies is resumed.

13. In a machine for operating on indicia bearing record bodies, means to transcribe the indicia of a body, sequentially related, preliminarily and selectively conditionable selectors for concurrently affording preselection of a number of record bodies to be transcribed in a sequence corresponding to the sequential relation of the selectors, mechanism coacting with the selectors for bringing the preselected bodies into cooperative relation to the transcribing means, means for causing the preselected number of bodies to be transcribed by the transcribing means in the aforesaid sequence, and means for automatically initiating operation of said mechanism, after the last of the number of preselected bodies has been transcribed, to effect return of the first of these preselected bodies into cooperative relation to the transcribing means.

14. In a machine for operating on a record tape subdivided into indicia bearing record bodies, analyzing means for analyzing the bodies for indicia, means to feed the tape in either of opposite directions to the analyzing means, preliminarily and selectively settable selectors for preselecting a pair of bodies of the tape for analysis, one body after the other, settable means to preselect either one of the directions of feed of the tape in which, after one of the preselected bodies has been analyzed, the next preselected body is to be fed to the analyzing means, and means controlled by said settable means and the selector for said next body, upon completion of the analysis of the other body, for causing the feeding means to feed the tape in the preselected direction to bring said next body to the analyzing means.

15. In a machine such as described, a record member having laterally spaced designation-bearing decks, each deck having successive rows of codal character designations spaced apart at right angles to the spacing of said decks, designation sensing means including optionally effective separate sensing sections, one for each deck for successively sensing the rows of character designations of the related deck, means controlled by one sensing section at a time, whichever is effective, according to the sensed designations for successively manifesting the sensed designations of the related deck, and means for selectively rendering the sensing sections effective.

16. In a machine such as described, a record member having a plurality of record decks, each having index positions in the same relation as on the other deck perforated with character and control designations, and means for reading out character designations solely according to index positions perforated to represent such designations irrespective of their location upon one deck or another and different significances of the control designations depending both upon the index positions perforated to represent the control designations and upon whether they are upon one deck or another.

17. Apparatus for operating on a record tape subdivided into laterally spaced decks, each having successive indicia bearing record bodies, comprising a plurality of indicia-reading means, one means for each deck, preliminarily and variably conditionable selectors for preselecting a pair of bodies, one from each deck of the tape to be read, and means acting in conjunction with the selectors for successively bringing the preselected pair of bodies from the different decks into cooperative relation to their respective means and causing the latter means to be effective in corresponding succession to read indicia of the preselected bodies.

18. Apparatus for operating on a record tape subdivided into laterally spaced decks, each having successive record bodies with each body having lines of indicia spaced apart in a direction at right angles to the spacing of the decks, comprising means to manifest the indicia, preliminarily and variably conditionable selectors to preselect a pair of bodies, one from each deck, to have their indicia manifested, and means acting in conjunction with the selectors for causing the preselected bodies to control the manifesting means in succession to manifest the lines of indicia on the preselected bodies.

ALBERT W. MILLS.
EDWARD J. RABENDA.